United States Patent
Abraham et al.

(10) Patent No.: US 6,829,618 B1
(45) Date of Patent: Dec. 7, 2004

(54) DISC LAYOUT AND OPTIMIZATION PROCESS

(75) Inventors: Thomas D. Abraham, Richmond, VA (US); Scott E. Levine, Midlothian, VA (US)

(73) Assignee: Digital Video Express, L.P., Herndon, VA (US)

( * ) Notice: Subject to any disclaimer, the term of this patent is extended or adjusted under 35 U.S.C. 154(b) by 0 days.

(21) Appl. No.: 09/325,346

(22) Filed: Jun. 4, 1999

Related U.S. Application Data

(60) Provisional application No. 60/088,220, filed on Jun. 5, 1998.

(51) Int. Cl.[7] ............................................. G06F 17/00
(52) U.S. Cl. ........................ 707/104; 707/7; 707/102; 386/95; 386/98; 369/30.09
(58) Field of Search .................. 345/302, 354; 386/98, 95, 30.09; 707/7, 104, 102; 709/247

(56) References Cited

U.S. PATENT DOCUMENTS

| | | | | |
|---|---|---|---|---|
| 5,546,365 A | * | 8/1996 | Roth ........................ | 369/30.09 |
| 5,764,980 A | * | 6/1998 | Daivs et al. ............... | 707/104 |
| 5,929,857 A | * | 7/1999 | Dinallo et al. ............. | 345/354 |
| 5,999,696 A | * | 12/1999 | Tsuga et al. ................. | 386/98 |
| 6,065,006 A | * | 5/2000 | DeCarmo et al. .............. | 707/7 |
| 6,100,881 A | * | 8/2000 | Gibbons et al. ............ | 345/302 |
| 6,181,870 B1 | * | 1/2001 | Okada et al. ................. | 386/95 |
| 6,230,209 B1 | * | 5/2001 | Zenda ........................ | 709/247 |

* cited by examiner

*Primary Examiner*—Charles Rones
*Assistant Examiner*—Thuy Pardo
(74) *Attorney, Agent, or Firm*—McDermott, Will & Emery; Paul Devinsky

(57) ABSTRACT

A method and apparatus for Disc Layout and Optimization (DLO) receives input such as a list of disc elements, a list of scene links, compiled code files, and still media files. The DLO also obtains information, e.g., from a work order, regarding the size of the target DVD disc, the number of layers on the disc, and whether the disc is a dual layer disc, the type of tracking used, i.e., parallel or opposite, etc. A scene is made up of one or more JARs, which are hierarchical. Navigation information from the scene code builder informs the DLO of the JAR types and scene flow. This allows the program to arrange the JARs and content to minimize the elapsed time between scenes. To accomplish this, a called JAR is placed within a reasonable distance of its calling JAR. If necessary, JARs will be replicated on the disc so as to keep the elapsed time as short as possible. Furthermore, replicated JARs that have no use will be deleted. Specifically, the method and apparatus creates and arranges JAR files and data files so as to minimize the elapsed time between scenes as perceived by the user, by minimizing seek time between elements on the disc.

27 Claims, 25 Drawing Sheets

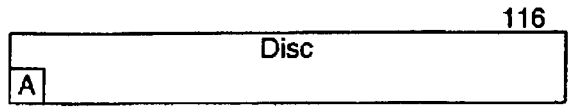
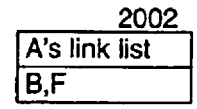
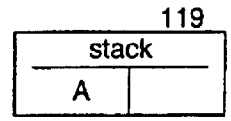
FIG. 20A     FIG. 20B     FIG. 20C
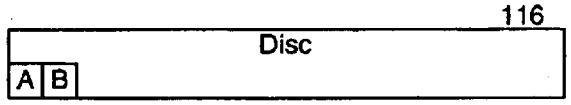
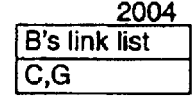
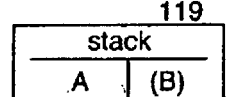
FIG. 20D     FIG. 20E     FIG. 20F
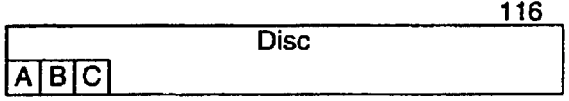
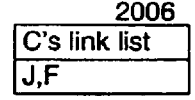
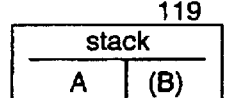
FIG. 20G     FIG. 20H     FIG. 20I
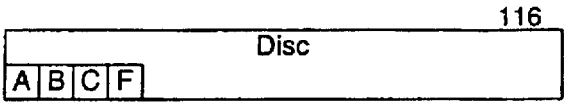
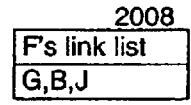
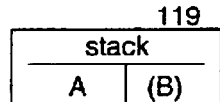
FIG. 20J     FIG. 20K     FIG. 20L
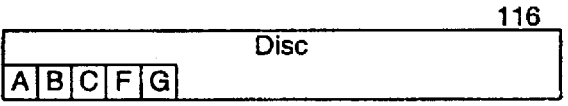
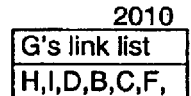
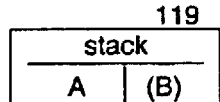
FIG. 20M     FIG. 20N     FIG. 20O
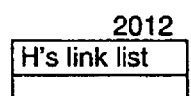
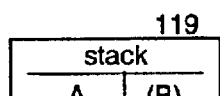
FIG. 20P     FIG. 20Q

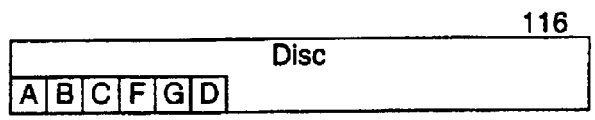
FIG. 21A
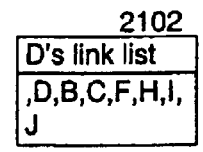
FIG. 21B
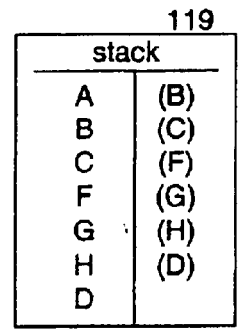
FIG. 21C
FIG. 21D
FIG. 21E - Example Initial Disc Layout
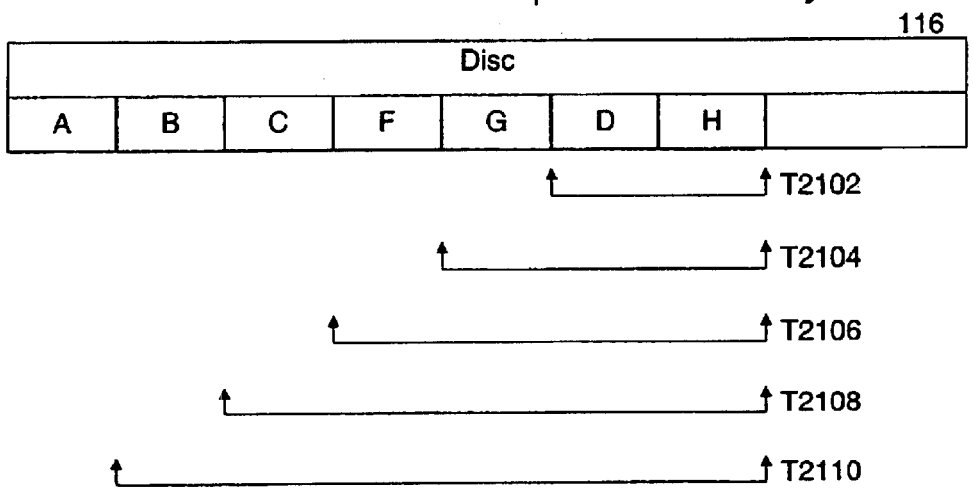

FIG. 25

| Scene Name | Size | # of occurrences | Location 1 | Location 2 | ... | Location N |
|---|---|---|---|---|---|---|
| 2502 | 2504 | 2506 | 2508 | 2510 | | 2512 |

DISC LAYOUT AND OPTIMIZATION PROCESS

This application claims benefit of Ser. No. 60/088,220 filed Jun. 5, 1998.

FIELD OF THE INVENTION

The present invention generally relates to organizing data structures on a storage medium. More specifically, the invention relates to a method and apparatus for optimizing the layout of data structures on a disc, such as a DVD disc.

An example of a DVD specification for a Read-Only Disc is published by Toshiba Corporation.

Such specifications ensure interoperability among different hardware implementations for accessing data on a DVD disc. Any optical DVD disc conforming to open video specifications and containing the correct video formatting can be played or read by any DVD player that was designed to play DVDs conforming to that open-format DVD specification. The general techniques for organizing ensembles on DVD media and the standards used are described in DVD Demystified, by J. Taylor, McGraw Hill (1988), Chapters 3 and 4 as well as the particular DVD specification.

BACKGROUND OF THE INVENTION

Unlike consumer VCR's where navigation commands such as "play", "forward" and "reverse" are a function of the hardware playback device, in the context of DVD discs, the navigation command structures are programmed in during the authoring stage (disc organization) and embedded in the disc. As a result, compressing audio and video does not by itself create a DVD; the compression merely provides video and audio files for the authoring process.

A sophisticated tool is required to assemble the content and create interactivity. This is known as DVD premastering and represents one of the most complex DVD disc organization tasks.

Authoring includes the processes that are performed (after video and audio encoding are performed) at what is generally known as a post house, and before disc replication at a stamping facility. It is the process in which, for example, the encoded audio and video are linked together, multiple language tracks are laid out, subtitles are imported or generated, chapter points and transport control functions are introduced, multi-story or multi-angle program chains are created, menus and buttons are designed, etc..

The first step is to lay out the disc in a storyboard that shows all of the disc elements plus all of the menus and navigation steps that will join the disc elements together as a seamless work. The storyboard process serves three main purposes: to provide a roadmap for different designers working on the same project, to avoid errors in disc element assembly and menu creation; as a checklist to minimize rework; and as a "preflight" navigation check to avoid dead ends, confusing or overly complicated menus, or inconsistent and user-unfriendly disc navigation.

The end result of the storyboard process is a complete roadmap of the work on the DVD disc, as well as a bit budget and disc element capture list.

The next step is to assemble all of the source elements that have been captured: MPEG video, audio, graphics, subtitles, and sub-pictures. These elementary files are liked together into objects with one or more video angle files associated with one or more audio clips and sub-picture clips. The objects are usually not multiplexed (interleaved) until the project is complete.

Importing stills for menus and creating highlight areas, colors and "hot spots" for buttons can be one of the most labor-intensive aspects of the process. It is essential to have a knowledge of multimedia programming and a graphical interface for sub-picture assembly that allows control over features such as fades, wipes, button activation times and highlights.

Once all the objects have been assembled, scene flow links are created to give the work interactivity. In this process, the pre and post-commands are set and links are made between the various disc elements. Still or motion video may be used as menus.

With all the navigation data and presentation data complete, the final project is then laid out. In this process all the presentation data (video, audio, and sub-pictures) are multiplexed together. The end result is a new set of files, which comply with the basic DVD format.

The last stage in DVD authoring is to create the disc image, a process by which the DVD files are formatted to a standard file system. This disc image is initially created on hard disc for proofing.

The above process describes an exemplary prior art method for creating basic DVD discs. However, advances in technology, such as for example the DIVX DVD, have enhanced basic DVDs by adding additional features, thereby enabling firmware applications and other multimedia applications to coexist on a DVD disc. However, these additional.-features on enhanced DVD disc come at the cost of an increase in storage used. The increase in storage results from the addition of data files and application files used to support the additional features.

The data layout for DVD discs in accordance with prior art systems as described above is very convoluted, possibly resulting in a multitude of links between the files on the disc. As the number of files increases, and the size of the files become larger, seek time is increased. However, with an increase in seek time, the quality of use of such systems is decreased resulting in a "dead image" when retrieving the next element in a scene.

What is needed is a method and apparatus for organizing data files on a DVD disc so as to minimize dead images when retrieving the next element in a scene.

SUMMARY OF THE INVENTION

The method and apparatus for Disc Layout and Optimization (DLO) in accordance with the present invention receives input such as a list of disc elements, a list of scene links, compiled code files, and still media files. The DLO also preferably obtains information, e.g., from a work order, regarding the size of the target DVD disc, the number of layers on the disc, and whether the disc is a dual layer disc, the type of tracking used, i.e., parallel or opposite, etc. Furthermore the DLO also preferably obtains an estimate of the amount of disc space used by all items except the JARs (files that contains other files). This allows a single disc request to load related files in a short amount of time. Files in a JAR may contain any type of data. The amount of disc space used by all items except the JARs, includes the file systems, open content (non-limiting examples include commercials), media content (non-limiting examples include movies), etc.

JARs from a scene code builder are authored to perform a specific application, e.g., movie play or catalog. A JAR may also contain code classes and/or static media. When a disc is loaded into a player, a JAR or multiple JARs are loaded into RAM in the player in order to interact with a user.

A player may be any system or device capable of reading a medium having a plurality of elements linked by a scene flow. Applications on disc which may have linked items may include movies, games, or any interactive elements. In a preferred embodiment of the present invention, the data elements include movie content and interactive video elements, and are used merely to facilitate the function of the invention, and is not intended to limit the scope or application of the invention to other data elements. Likewise, in a preferred embodiment of the present invention, the player is a DVD player, which is used merely to facilitate the function of the invention, and is not intended to limit the scope or application of the invention to other players, such as computers or video game players.

A scene is made up of one or more JARs. The JARs in a scene are hierarchical. This means that a JAR may only call a JAR immediately below it. All JARs in the hierarchy remain in memory for the duration of the scene. The JARs that remain in memory are called transaction JARs. Transaction JARs are used as a shared memory area to pass information between scenes. Transactions may be nested creating distinct shared memory areas.

The navigation information from the scene code builder informs the DLO of the JAR types and scene flow. This allows the program to arrange the JARs and content to minimize the elapsed time between scenes. To accomplish this, a called JAR is placed within a reasonable distance of its calling JAR. If necessary, JARs will be replicated on the disc so as to keep the elapsed time as short as possible. Part of the scene flow information tells the DLO when a transaction JAR is unloaded. This facilitates memory computations.

The DLO is also aware of memory constraints, defined by players on the market, which information is passed as a configuration parameter from a configuration file. The DLO will not build a disc layout that it believes will exceed the memory available to it. Preferably, memory checking may be disabled through a configuration parameter.

It is an object of the present invention to solve the deficiencies of the prior art in the field of DVD disc layout. Specifically, it is an object of the present invention to create and arrange JAR files and data files so as to minimize the elapsed time between scenes as perceived by the user.

It is yet another object of the present invention to provide a method and system for optimizing a disc layout containing data files, firmware applications, and multimedia applications so as to minimize seek time between elements on the disc.

To achieve the foregoing and other objects and in accordance with the purpose of the present invention, as embodied and broadly described herein, the method for optimizing a disc layout having disc elements and scene links of this invention may comprise the steps of reading the disc elements, reading the scene links, creating implicit links between at least two scene links, and the implicit links, and replicating at least one of the disc elements onto the initial layout thereby creating a modified layout.

In a preferred embodiment of the present invention, the method for optimizing a disc layout further comprises the step of creating navigation tables having sector addresses for each disc element and sector addresses for replications of each disc element.

In another preferred embodiment of the present invention, the step of creating implicit links between at least two scene links further comprises the step of expanding a disc element thereby identifying the disc elements' links.

In yet another preferred embodiment of the present invention, the method for optimizing a disc layout further comprises the step of creating firmware JARs.

In still another preferred embodiment of the present invention, the method for optimizing a disc layout further comprises the step of determining if the disc is an opposite track dual layer disc. Particularly, when the disc is determined to be an opposite track dual layer disc, the method for optimizing a disc layout further comprises the step of determining whether the addition of the item will move a split point on the disc. More particularly, when the addition of the item is determined to move the split point on the disc, the method for optimizing a disc layout further comprises the step of moving the split point on the disc.

In general, another aspect of the present invention features a method for optimizing a disc layout having disc elements and scene links comprising the steps of reading the disc elements, reading the scene links, creating implicit links between at least two scene links, performing an initial layout of the disc elements, the scene links, and the implicit links, replicating at least one of the disc elements onto the initial layout thereby creating a modified layout; and removing at least one disc element from the modified layout.

In general, yet another aspect of the present invention features a method for optimizing a disc layout according to layout having disc elements and scene links comprising the steps of reading the disc elements, reading the scene links, creating implicit links between at least two scene links, performing an initial layout of the disc elements, the scene links, and the implicit links, replicating at least one of the disc elements onto the initial layout thereby creating a modified layout, removing at least one disc element from the modified layout, and performing a final layout of the disc elements, the scene links, and the implicit links.

In a preferred embodiment of the present invention, the method for optimizing a disc layout further comprises the step of determining whether any scene links or implicit links are larger than a predetermined memory.

In general, still another aspect of the present invention features a computer system for optimizing a disc layout having disc elements and scene links comprising a means for reading the disc elements, a means for reading the scene links, a means for creating implicit links between at least two scene links, a means for performing an initial layout of the disc elements, the scene links, and the implicit links, a means for replicating at least one of the disc elements onto the initial layout to create a modified layout.

In a preferred embodiment of the present invention, the computer system further comprises a means for removing at least one disc element form the modified layout. Preferably, the computer system further comprises a means for performing a final layout of the disc elements, the scene links and the implicit links.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate exemplary embodiments of the present invention and, together with the description, serve to explain the principles of the invention. In the drawings:

FIGS. 20A–20Q depict methods for determining an initial disc layout.

FIGS. 21A–21E are depict methods for determining an initial disc layout.

FIG. 25 is an exemplary navigation table in accordance with the present invention.

DETAILED DESCRIPTION OF THE INVENTION

Reference will now be made in detail to the present preferred embodiment of the invention, an example of which is illustrated in the accompanying drawings.

Figure 1:
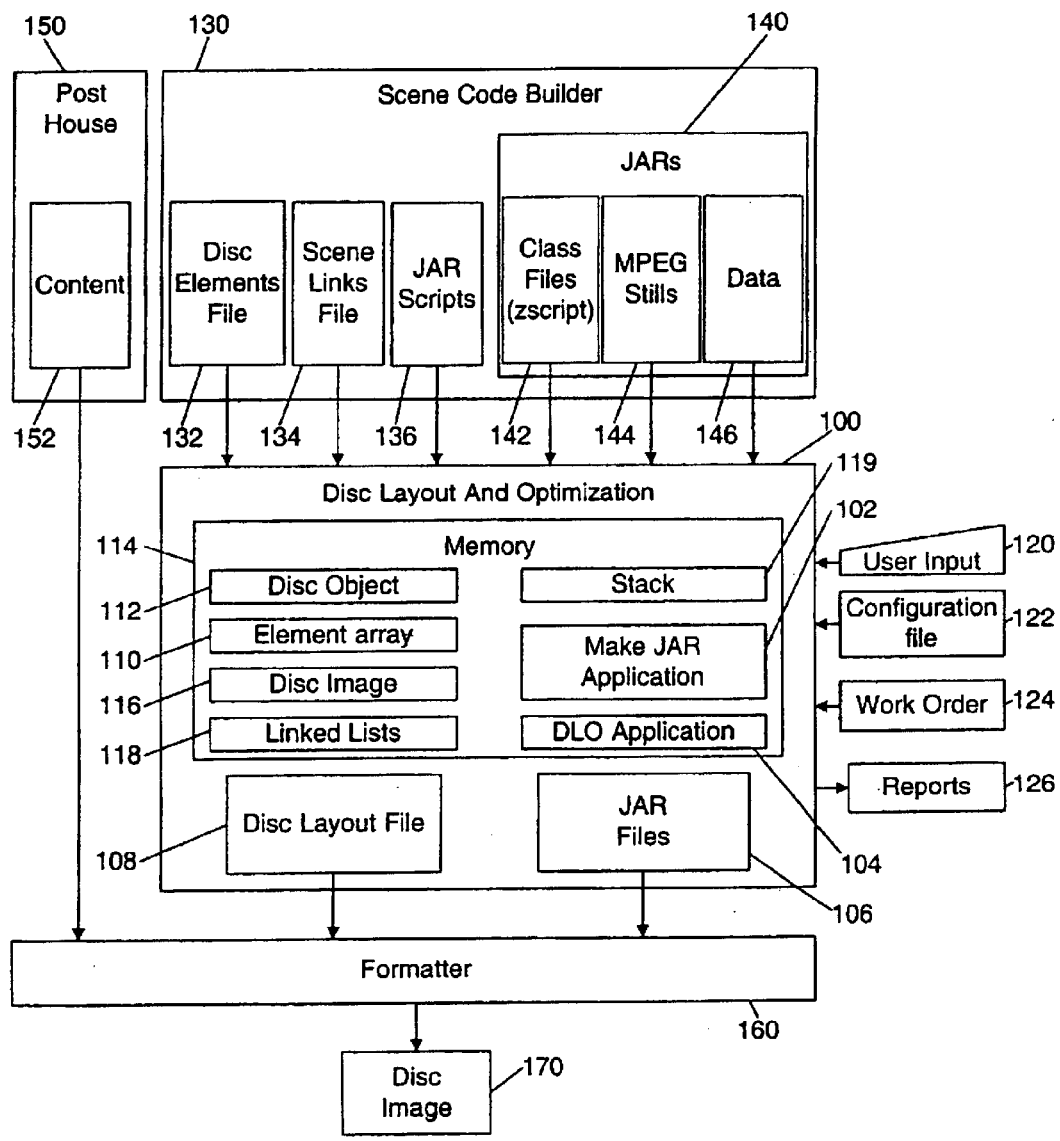
FIG. 1 is a diagram depicting an exemplary disc layout and optimization system (DLO) illustrating the relevant inputs and outputs in accordance with the present invention.

FIG. 1 is a diagram depicting an exemplary DLO having various inputs and outputs in configured accordance with the present invention. DLO 100 may be a software application or hardware device. According to a preferred embodiment, the DLO 100 is a software application. This embodiment is merely representative of the form and function of the present invention, and is not intended to limit the scope of the invention to software applications.

As seen in FIG. 1, the DLO 100 comprises a memory area 114, JAR files 106, and a disc layout file 108. The memory area 114 serves many functions, and may be compartmentalized into a stack 119, which is a LIFO (last in first out) memory, a make JAR application 102, a DLO application 104, a disc object 112, which represents a description of a file on a disc (non-limiting examples of which include content, JAR, etc.), element arrays 110, which may comprise an array of disc objects, disc image 116, and linked lists 118, which may include a link list of objects that describes how the objects are set on the disc, and a scene link list that describes how the scenes are linked to each other on the disc.

Information may be input to the DLO 100 from various sources such as for example: a user input 120, which may for example, support a command line interface; a configuration file 122, which may comprise input parameters, file locations, and seek distances; and a work order 124, which may comprise items such as the title identification and billing information.

Reports 126 are output information from the DLO 100. Non-limiting examples of reports 126 include: debug reports, which monitor memory check, stack dump, initial layout, and final layout; error reports, which monitor any errors; exception reports that list items which effect optimization but are not errors; and events reports, which monitor each routine called.

A scene code builder 130 "authors" data into the DLO 100 in the sense that it organizes processes performed after video and audio encoding. The scene code builder 130 may be a software application or hardware device. According to a preferred embodiment, the scene code builder 130 is a software application. Furthermore, the scene code builder 130 may be an application or device separate and distinct from that of the DLO 100. In other embodiments, the scene code builder 130 may be an application or device integral with that of the DLO 100. According to a preferred embodiment, scene code builder 130 is an application running on a separate system, distinct from that of the DLO 100. The illustrated embodiment is merely representative of the form and function of the present invention, and is not intended to limit the scope of the invention to software applications, to an integral system or to a combination of distinct systems.

In a manner similar to the DLO 100, the scene code builder 130 provides many functions, and may comprise: a disc elements file 132, which is every item on the disc being optimized; a scene links file 134, which is a list of explicit links; a JAR scripts 136, which details what files go in each JAR; and the JARs 140. An explicit link may be described as an element to element connection that is specified by the scene code builder process. For example, a transaction JAR is loaded and the user wishes to see a screen that has a list of previews. The laser is currently at (or near) the end of the transaction JAR and needs to access the screen/code JAR. The JARs 140 may further comprise: class files 142, which are code files; MPEG stills 144, and data 146, which includes non-MPEG data, firmware data (firmware is embedded software that is executed inside a DVD player), and miscellaneous data.

A post house 150, which processes the original content and provides a digital image of the content 152. The content 152 is sent to a formatter 160. Disc layout information from the disc layout file 108, and JAR information from JAR files 106, are also sent to the formatter 160 which provides an output to a disc image 170.

Figure 2:
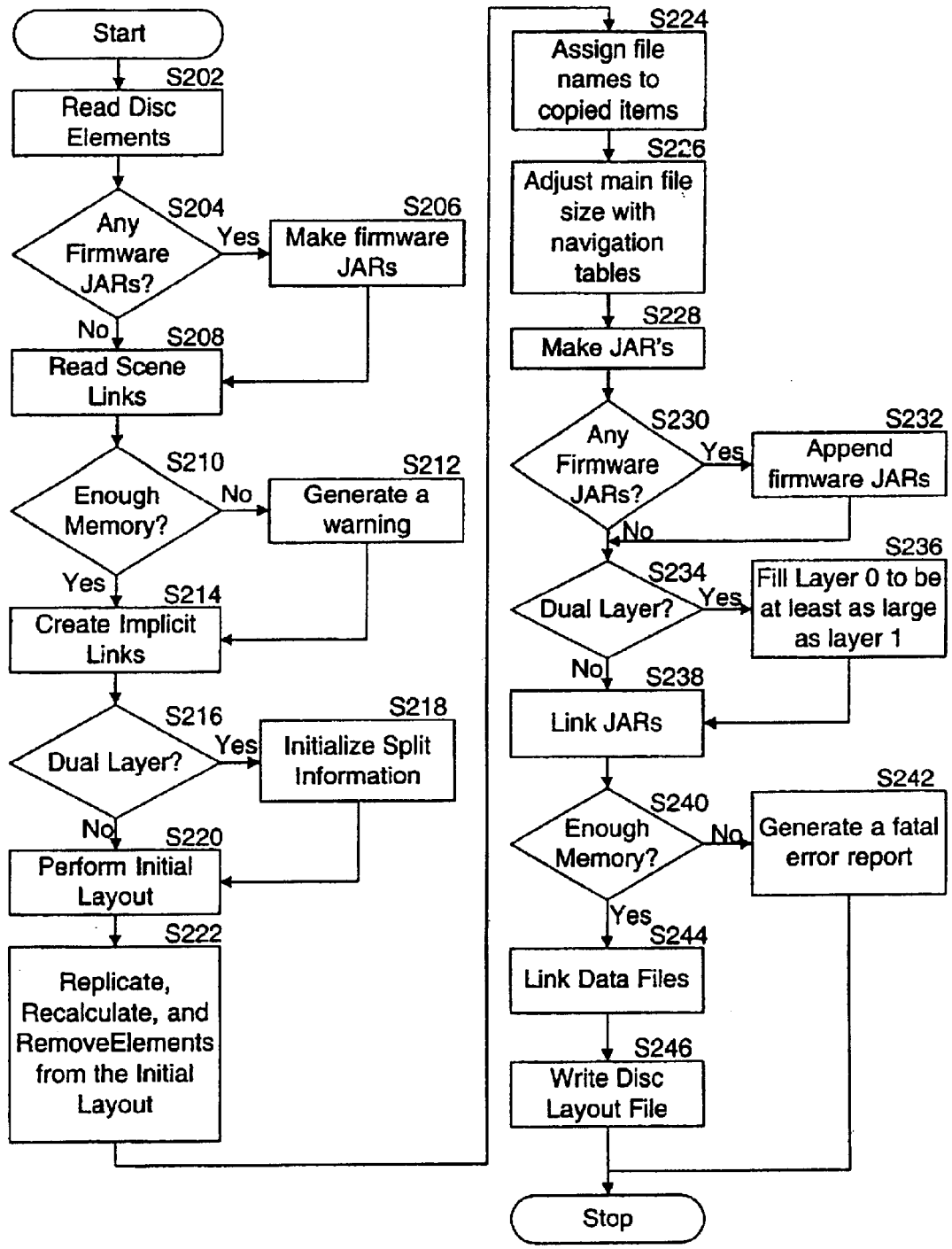
FIG. 2 is a flow diagram illustrating an exemplary embodiment of the logic flow for the operation of the DLO in accordance with the present invention.

FIG. 2 is an exemplary embodiment of a DLO logic flow diagram in accordance with the present invention.

As seen in FIG. 2, the DLO 100 reads the disc elements from the disc elements file 132 (S202). The system determines from the firmware data supplied from data 146 whether any firmware JARs are needed from the work order 124 (S204). If firmware JARs are needed, then the firmware JARs are created at the make JAR application 102 (S206). If firmware JARs are not needed, or they have already been created, the system then reads the scene links from the scene links file 134 (S208).

The DLO then determines whether there is enough memory available on the disc in accordance with a preset standard supplied from the configuration file 122 (S210). If there is not enough memory, then a warning is generated (S212), which is output as an error report from reports 126. If there is enough memory (S210), or a warning has been given about insufficient memory (S212), then implicit links are created (S214).

Figure 19:
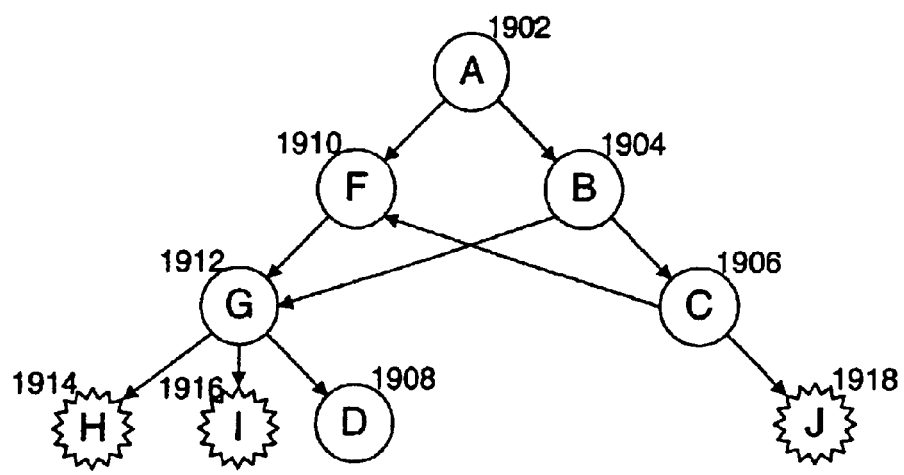
FIG. 19 is an exemplary scene flow diagram depicting elements and their linked relationships.

An implicit link may be described as an element to element connection that is not specified by the scene code builder process, but rather is derived from the scene flow by the DLO. The descendants of a transaction JAR have implicit links to its ancestral transaction's explicit links. This allows the DLO to place called elements near where the laser may be pointing in addition to placing them ear the transaction itself. For example, as seen in FIG. 19, in an exemplary scene flow diagram, item A 1902 is a transaction JAR and is initially loaded into memory. If the user traverses down a first path to item F 1910, the element is read from the DVD disc and the laser in the player moves to the end of item F 1910. When the user returns to item A 1902, logically the screens return to A but the laser remains at the end of the most recently read element, item F 1910. So, when the user then traverses down a second path to and item B 1904 is accessed, the seek time is based from the laser's current position, at item F 1910, to the closest position of item B 1904, causing an implicit link from item F 1910 to item B 1904.

Next, the DLO determines whether the disc has an opposite track path dual layer layout (S216). If the disc includes an opposite track path dual layer layout then a method to split the information is initialized (S218). On an opposite track path dual layer disc, the split point is the sector on the disc at which the DVD laser refocuses from one layer to the other and disc spin direction reverses in order for the player to read that sector. When a dual layer movie is received, a file created by the input process specifies where the movie is to be split, i.e., where the layer change is to take place.

On the other hand, if there is no opposite track path dual layer (such as a parallel track path, which does not have split points), or after the split information routine has been completed, the initial layout is performed on the disc (S220).

Disc elements are then replicated onto the initial layout thereby creating a modified layout; link lengths on the modified layout are recalculated, and unnecessary elements are removed from the modified layout (S222). File names are then assigned to copied items (S224).

As opposed to prior art systems, in the present invention, each copied item does not need a separate and distinct file name for the internal file system. Here the file names of the copied items remain that of the original item. The system keeps track of the addresses of the copied items by means of the navigation tables. FIG. 25 is an exemplary navigation table in accordance with a preferred embodiment of the present invention. The navigation table of FIG. 25 comprises a plurality of fields having the following headers: scene name 2502, 2504, # of occurrences 2506, location 1, location 2, . . . , and location N 2512. The scene name field 2502, identifies the disc elements, whereas the size field 2504, lists the elements' respective sizes. The # of occurrences field 2506, stores the number of occurrences of the respective element on the disc. This number will be equal to one, plus the number of times the element is copied, minus the number of times the element, is removed. Location 1 field 2508, location 2 field 2510, . . . , and the location N field 2512, each stores a respective location address of each copy of an element on the layout. The number of location fields corresponds to the number stored in the # of occurrences field 2506. In essence, for every occurrence of an element, there is a corresponding, location field storing that copy's location address.

Internally, the files have the same name, for example JARs have a JARName field in the header of the navigation table, and the JARName field in the header of the navigation table is the same for every copy of a particular JAR. By not assigning a new file name to a copied item, memory is conserved. However, because of external file system requirements, separate and distinct files names are required as far as the DVD disc itself is concerned. In other words, externally, the file system requires that each copy have a different name.

After file names are assigned to copied items (S224), the main file size is adjusted with navigation tables (S226). Navigation files are stored in the main JAR residing in memory. The DLO estimates the size of the main JAR, however, this estimation may be incorrect. In the event the estimation is incorrect, the entire layout is adjusted to accommodate the difference. When the layout is moved, the location of each of the files changes correspondingly. Therefore, all the navigation tables are rebuilt in accordance with the adjustment. The remaining JARs are then made (S228). As opposed to step S206, wherein firmware JARs are created, in step S228 all other JARs are created.

The DLO then determines whether there were any firmware JARs (S230), which would have been made at step S206. If there are firmware JARs, they are appended to the navigation tables (S232). If there are no firmware JARs, or after the firmware JARs have been appended to the navigation tables, it is then determined whether the disc has more than a single layer layout, or dual layer parallel track layout (234). On an opposite track dual layer disc, the size of layer 0 must be greater than or equal to the size of layer 1. According to DVD physical specifications, on the dual layer of the opposite track path, sectors on each layer with the bit-inverted physical sector number to each other are at almost the same distance from the center on the disc. If, after optimization, layer 1 is larger than layer 0, a filler file is created to equalize the size of the layers. If a file is created, the navigation tables are rebuilt to accommodate the added filler file. If the disc has an opposite track dual layer layout, then layer 0 must be filled at least as large as layer 1 (S236).

If the disc does not have an opposite track dual layer layout, or layer 0 has been filled as large as layer 1, then the JARs are linked (S238). Linking is a method of copying files on a host file system, thereby making multiple directory entries per file. Once the JARs are linked, it is determined whether the disc layout is within memory limit as dictated by the configuration parameter in the configuration file (240). If the disc layout takes up more memory than the predetermined memory limit, a fatal error report is generated (S242), which is sent as an error report from reports 126. If the disc layout is within. the predetermined memory limit, the data files are linked (S244). After the data files are linked, the disc layout file is written onto disc (S245).

Figure 3:
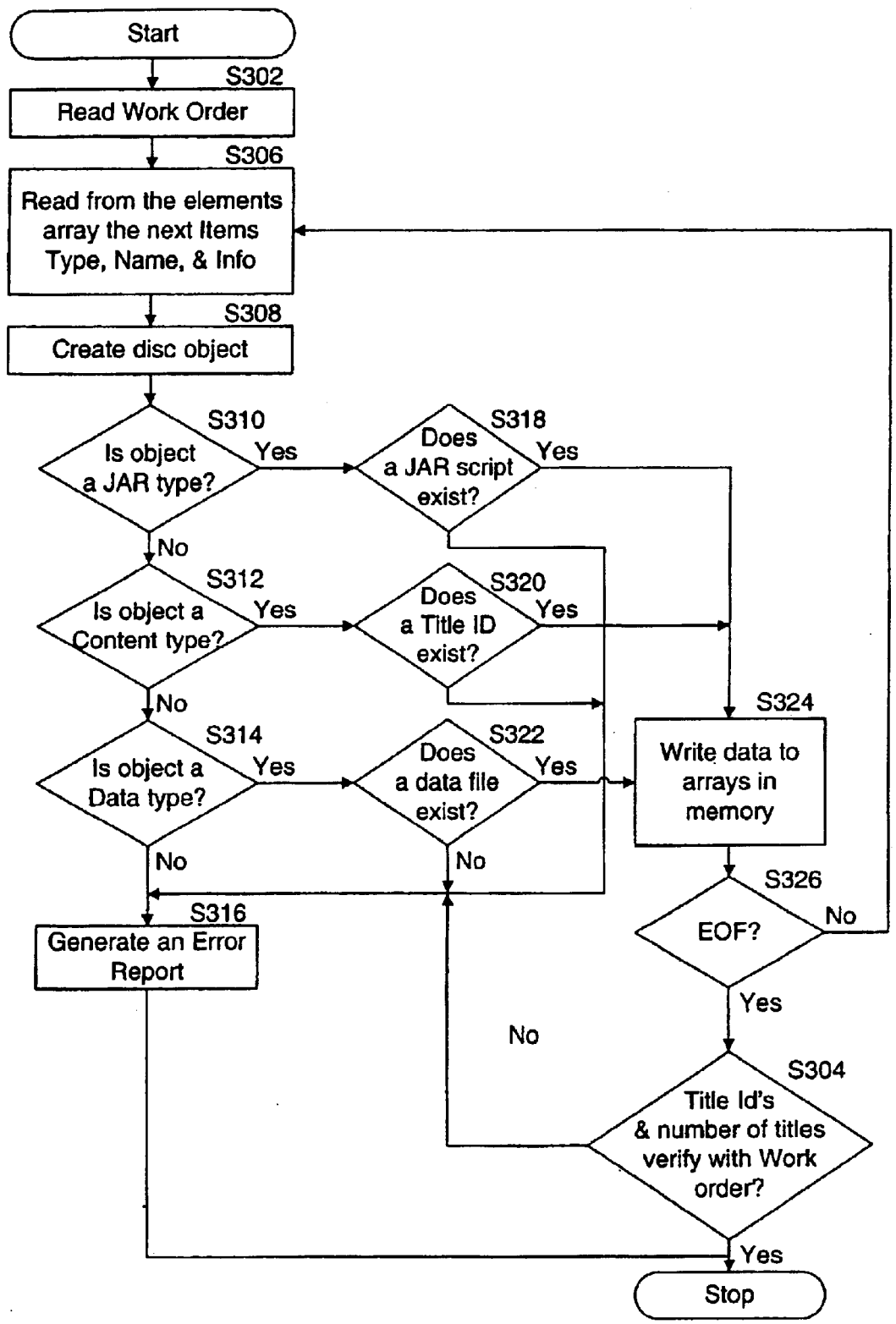
FIG. 3 is a logic flow diagram of an exemplary embodiment of a subroutine for reading the disc elements in the logic flow diagram of FIG. 2.

FIG. 3 is a logic flow diagram of an exemplary embodiment of a subroutine for reading the disc elements (S202) in the DLO system of FIG. 2. Initially, the work order is read from work order report 124 (S302). The first item's type, name, and information are then read from the elements file 132 (S306). A disc object is then created for the item read from the elements file 132 (S308).

The exemplary routine then determines whether the newly created object is a JAR file (S310). If the object is a JAR file, a determination is made whether a corresponding JAR script exists, as read from JAR scripts 136, for that JAR file (S318). If a corresponding JAR script does not exist for that JAR type, an error report (S316) is generated, which is sent out on an error report from reports 126. If a corresponding JAR script exists for that JAR type, then the data is written to the element array 110 in memory 114 (S324). Once the data is written into memory 114, it is determined whether the data is at the end of the disc elements file as read from disc elements file 132 (S326). If it is determined that the data is not at the end of the file, then the next item's type, name, and information are read from the elements array 110, i.e., the logic returns to step S306. If it is determined that the data is at the end of the file, it is then determined whether the title identification codes and the number of titles on the disc verify with the work order (S304). If the title identification codes and the number of titles on the disc do not correlate with the work order, then an error report is generated (S316), which is output from reports 126, and the subroutine stops. If the title identification codes and the number of titles on the disc do correlate with the work order, then the subroutine ends.

After a disc object is created for the item read from the elements file 132 (S308), and it is determined that the newly created object is not a JAR file (S310), it must then be determined whether the newly created object is a content type file (S312). If the newly created object is a content type file, a determination is made whether a corresponding title ID, as read from the work order 124, exists for that content type (S320). If a corresponding title ID does not exist for that content type, an error report is generated (S316), which is output from reports 126. If a corresponding title ID exists for that content type, then the data in the content type file is written to the element arrays 110 of the memory 114 (S324). Once the data is written into memory 114, it is determined if the subject data file is at the end of the disc elements file 132 (S326). If it is determined the subject data file is at the end of the disc elements file 132, then reading of the disc elements is stopped. If it is determined that the subject data file is not at the end of the disc elements file 132, the next item's type, name, and information are read from the disc elements file 132 (i.e. the routine returns to step S306).

After a disc object is created for the item read from the disc elements file 132 (S308), and if it is determined that the newly created object is not a JAR type file (S310), and if it is then determined that the newly created object is not a content type file (S312), it must then be determined whether the newly created object is a data type file (S314). If the newly created object is a data type file, it is determined whether a corresponding data file, as imported from data 146, exists for that data type file (S322). If a corresponding data file does not exist for that data type, an error report is generated (S316), which is output from reports 126. If a corresponding data file does exists for that data type file, then the data is written to the elements arrays 110 in memory 114 (S324). Once the data is written into memory, it is determined whether the subject data file is at the end of the file as read from the disc elements file 132 (S326). If the subject data file is at the end of the file, then reading of the disc elements from the disc elements file 132 is stopped. If the subject data file is not at the end of the file, the next item's type, name, and information are read from the Elements Arrays 110 (i.e., the logic returns to step S306).

Referring back to FIG. 2, once all the disc elements have been read (S202), as described above with reference to the exemplary logic flow diagram of FIG. 3, it is determined whether there is a need for any firmware JARs (S204). If there is a need for firmware JARs, the firmware JARs are made (S206).

Figure 5:
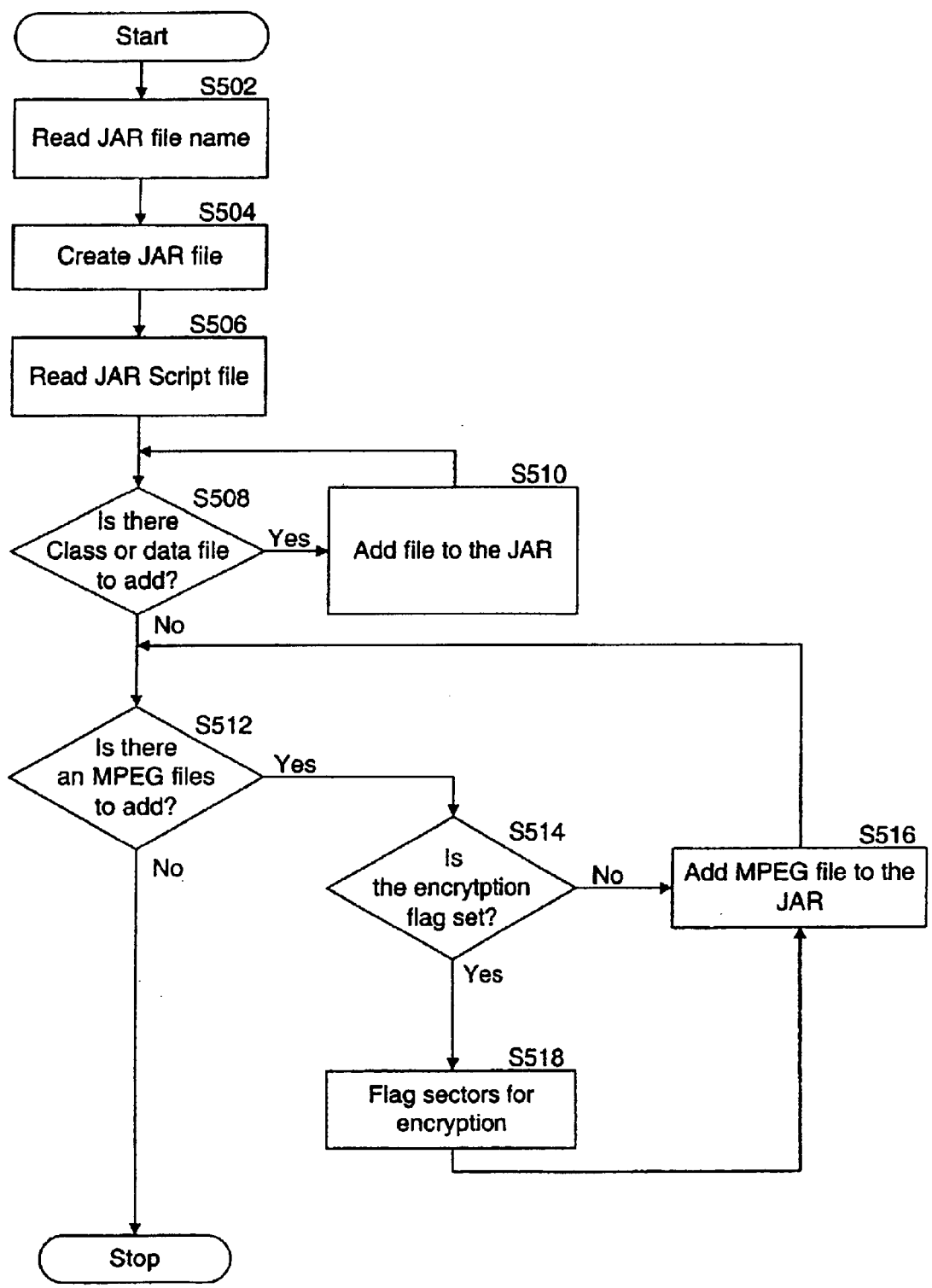
FIG. 5 is a logic flow diagram of an exemplary program for making the JARs, used in the logic flow diagram of FIG. 2.

FIG. 5 is a logic flow diagram of an exemplary subroutine for making the JARs. Firmware file names come from the work order 124 and the DLO creates the corresponding script file. Alternatively, all the JARs are created from data supplied by the scene code builder data 140. Then firmware JARs are created in the JAR Files 106 (S504). Then the JAR script file is created by the DLO. Furthermore, running mark JARs, which are similar to firmware JARs are created in this same fashion. It is then determined whether there is a class file or data file to add to the JAR file as imported from class files 142 and data 146 (S508). If there is a class file or data file to add to the JAR file, such class file or data file is added to the JAR file (S510), then the step is repeated until there are no class or data files to add to the JAR file (i.e., the logic returns to step S508). When it is determined that there are no class or data files to add to the JAR file (S508), it is determined whether there are any MPEG files to add to the JAR file as imported from MPEG stills 144 (S512). If there are MPEG files to add to the JAR file, then it is determined if the encryption flag in the script is set (S514). If the encryption flag is set, then the sectors of the disc are flagged for encryption (S518). If no encryption flag is set, or if the sectors are already flagged for encryption, the MPEG file is added to the JAR file (SSI6). This process is repeated until there are no MPEG files to add.

Figure 4:
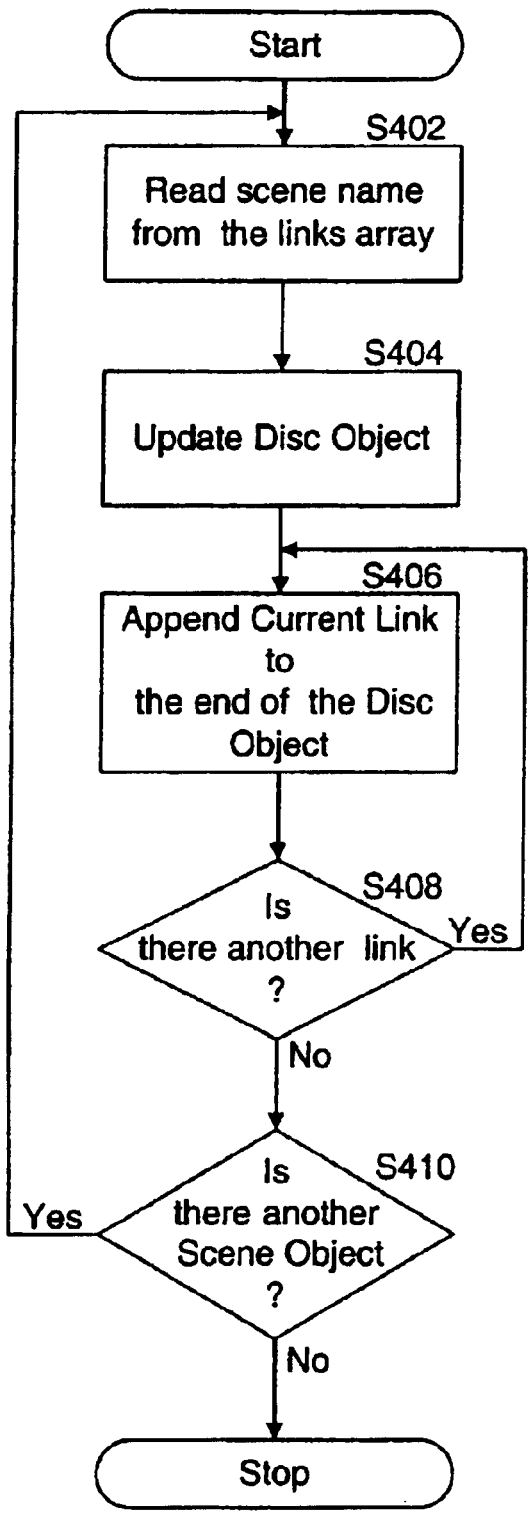
FIG. 4 is a logic flow diagram of an exemplary embodiment of a subroutine for reading scene links is the logic flow diagram of FIG. 2.

Referring back to FIG. 2, if there are no firmware JARs (S204), or the firmware JARs have been created (S206), the scene links are then read (S208). FIG. 4 is a logic flow diagram of an. exemplary embodiment of a subroutine for reading the scene links (S208) in the DLO system of FIG. 2. A scene link is an element-to-element connection that is derived from the scene flow by the DLO 100. This allows a single disc request to load related files in a short amount of time. Files in a JAR may contain any type of data. FIG. 19 depicts an example of a scene flow directed by links. As depicted in FIG. 19, each element (JAR or content) is represented using a circle and a letter, i.e. items A 1902, B 1904, C 1906, F 1910, and G 1912. All content (media without code) is identified with a starburst shape and letter, i.e. items H 1914, 1 1916, and J 1918. A primary path, or path that leads directly to the movie, is presented using the solid arrowhead lines. The secondary paths leading to other transactions are presented using dotted arrowhead lines.

The logic flow diagram of FIG. 4 will now be described in conjunction with the sample scene flow depicted in FIG. 19. The scene name is read from the links file (S402), for example, item A 1902. The disc object's link list is then updated (S404). The current link is then appended to the end of the disc object (S406). It is then determined if there is another link associated with that disc object (S408). If there is another link associated with that disc object, then the current link is again appended to the end of the disk object (i.e., the logic returns to step S406), i.e. item B 1904. If there is not another link associated with that disc object, then it is determined whether there is another scene object (S410). If there is another scene object, then the scene name is read from the links array (i.e., the logic returns to step S402), i.e. item F 1910. If there are no other scene objects, then. all the scene links have been read into the system. In other words, the above sequence is repeated until all the items 1902–1918, have been mapped out in accordance with their respective links.

Figure 8:
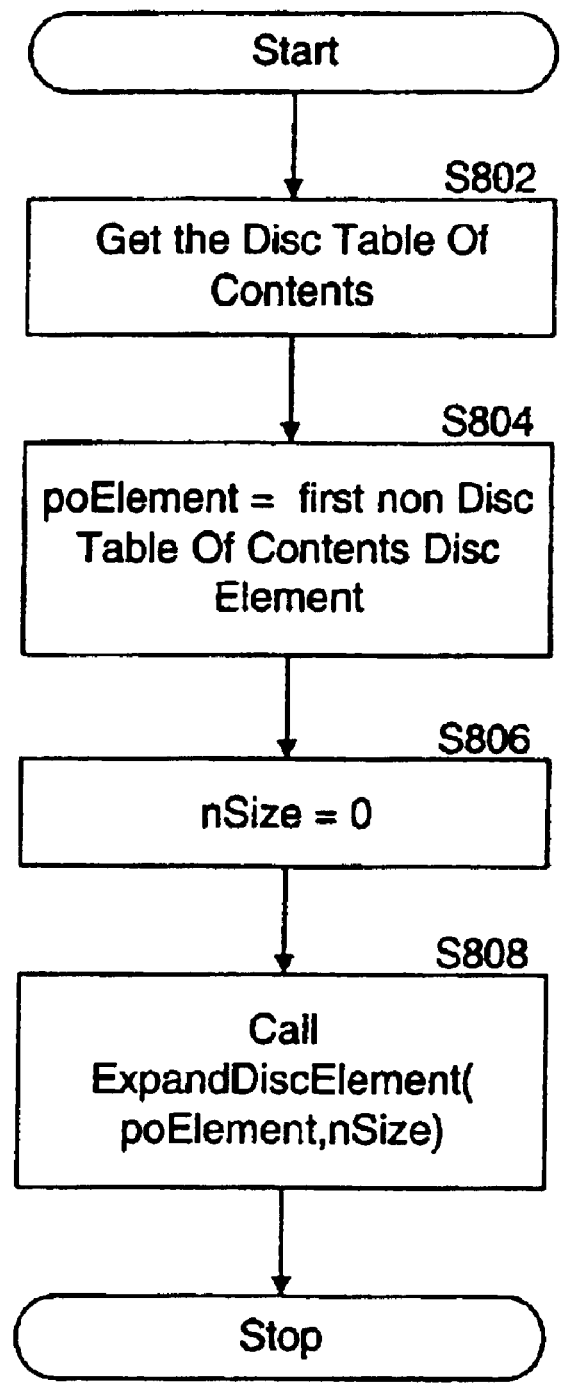
FIG. 8 is a logic flow diagram of an exemplary embodiment of a subroutine for checking the memory in the logic flow diagram of FIG. 2.

Referring back to FIG. 2, once the scene links are read (S208), it is determined whether there is enough memory as predetermined by the configuration parameter in the configuration file (S210). FIG. 8 is a logic flow diagram of an exemplary embodiment of a subroutine for checking the memory in the DLO system of FIG. 2. First a disc table of contents is obtained from the element array 110 (S802). A pointer element, poElement, is then set as the first element which is not in the disc table of contents (S804). A local variable counter, nSize, is then set equal to zero (S806). The first element that is not in the disc table of contents is then expanded (S808).

Figure 9:
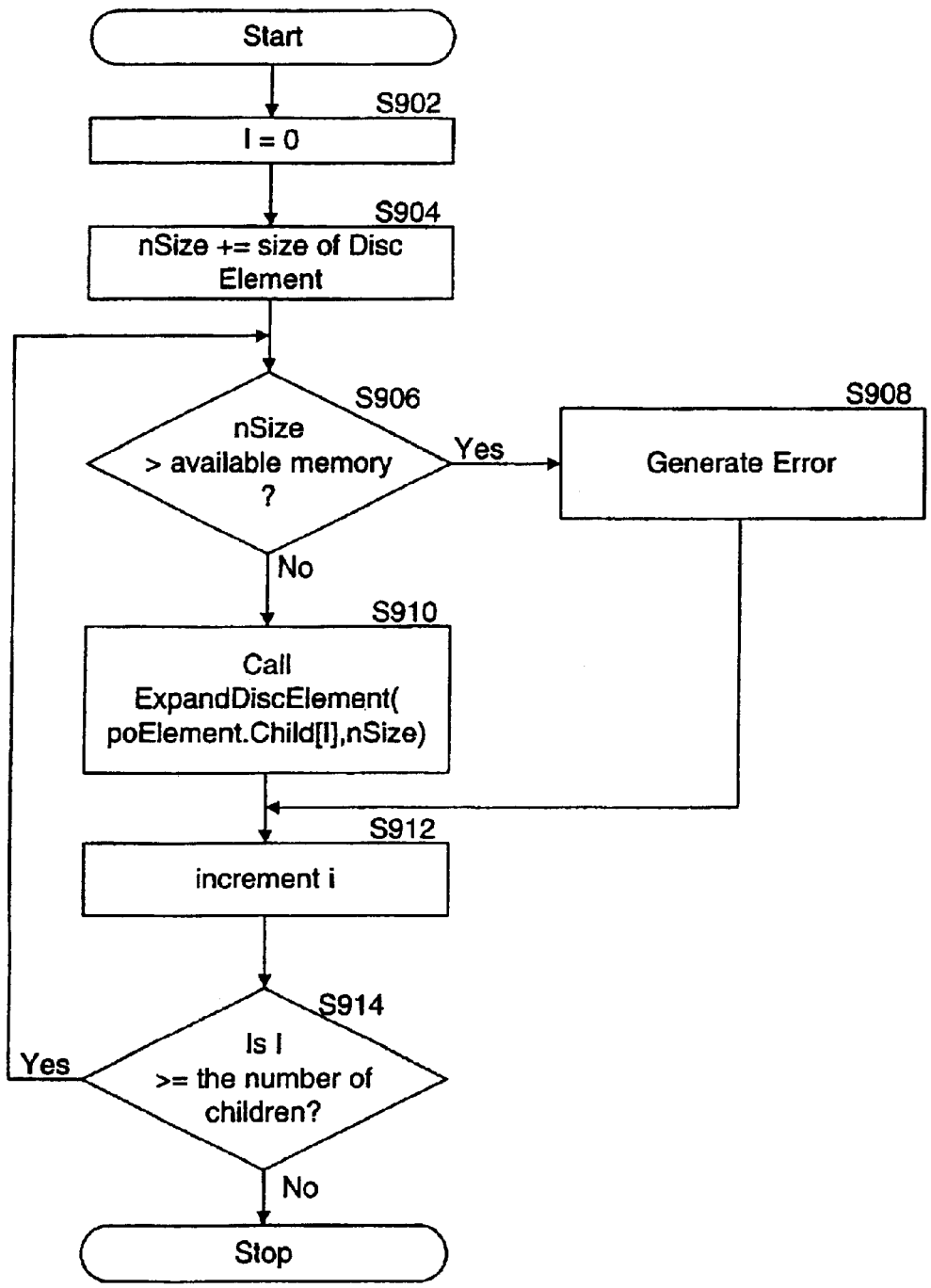
FIG. 9 is a logic flow diagram of an exemplary embodiment of a subroutine for expanding elements in the logic flow diagram of FIG. 2.

FIG. 9 is a logic flow diagram of an exemplary embodiment of a subroutine for expanding elements for the memory check subroutine of FIG. 8 (S808). By expanding an element, all the child elements that are linked to that element are outlined. The expansion as depicted in FIG. 9 is described below with reference to FIGS. 19 and 20A–20Q.

As depicted in FIG. 9, first an index I is set to zero (S902), and a variable nSize is increased by the size of the disc element that is being expanded (S904). For example, item A 1902 is read, placed on disc 116, as seen in FIG. 20A. and A's link list 2002 is read, as seen in FIG. 20B. It is then determined whether the amount of space used on the disc, nSize, as originally imported in step S808, is greater than the available memory as dictated by the configuration file 122 (S906). If nSize is greater than the available memory (as predetermined from a configuration parameter from the configuration file), an error (S908) is generated, which is output from reports 126. If nSize is less than or equal to the available memory, the next child of that disc element is expanded (S910). In essence, every child linked to A 1902 is eventually placed on the disc. This iteration is repeated until the first index I is greater than or equal to the number of children. Therefore, as every child is processed, I is incremented until I is equal to or greater than the number of children.

Figure 6:
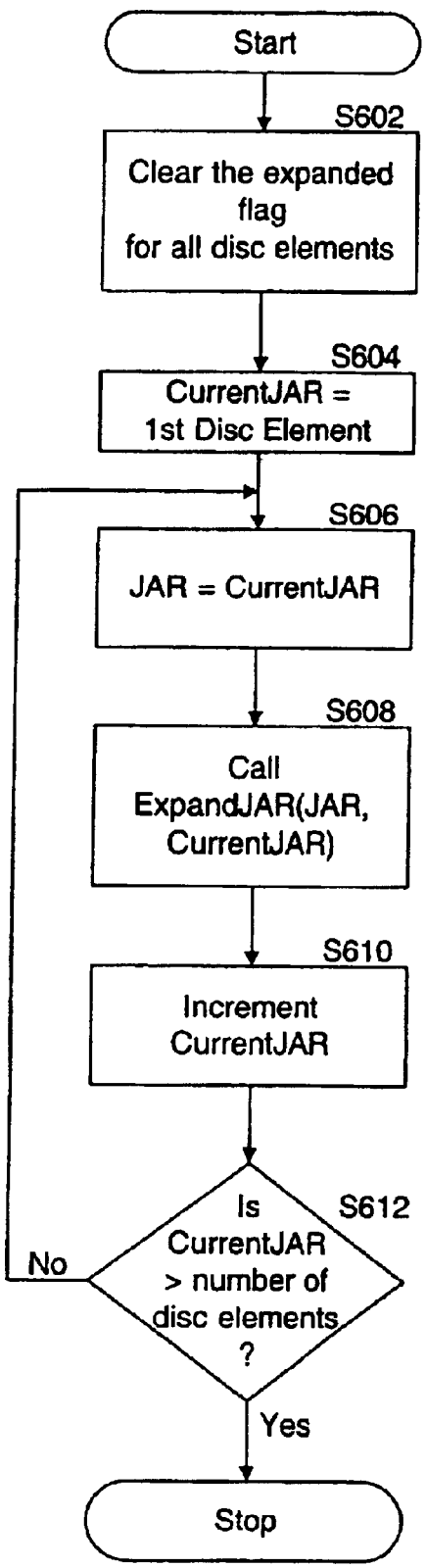
FIG. 6 is a logic flow diagram of an exemplary embodiment of a subroutine for creating implicit links in the logic flow diagram of FIG. 2.

Referring back to FIG. 2, once the memory size is checked (S210), implicit links are created (S214). FIG. 6 is a logic flow diagram of an exemplary embodiment of a subroutine for creating implicit links (S214) in the DLO system of FIG. 2. First the expanded flag for all the disc elements is cleared (S602). This indicates that no elements have been expanded. Then the current JAR, CurrentJAR, is set to the first disc element (S604). The JAR is then expanded (S608). The following JARs are then called and expanded until there are no more JARs to expand (S610–S612).

Figure 7:
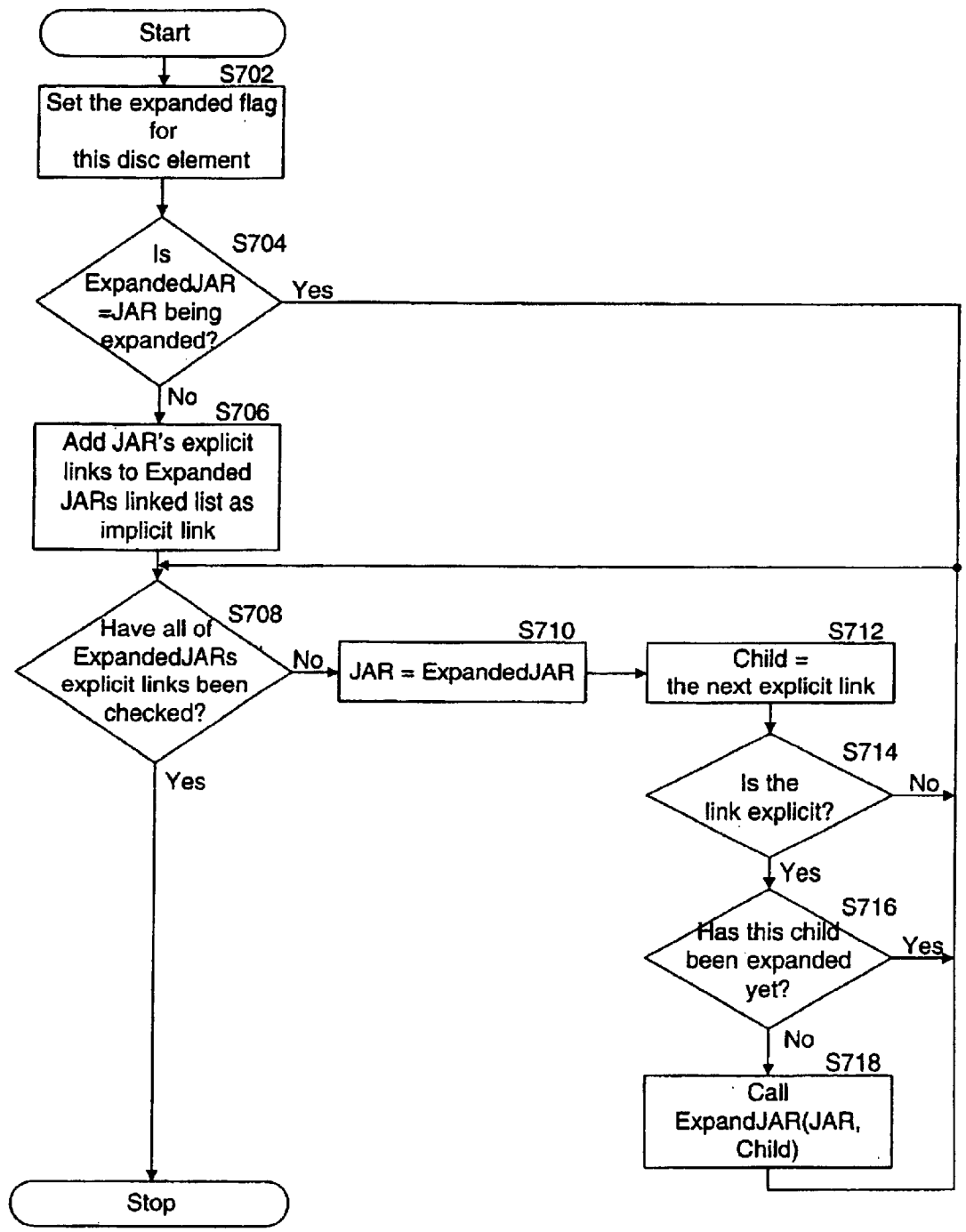
FIG. 7 is a logic flow diagram of an exemplary embodiment of a subroutine for expanding JARs in the logic flow diagram of FIG. 2.

FIG. 7 is a logic flow diagram of an exemplary embodiment of a subroutine for expanding a JAR to create implicit links in the subroutine in FIG. 6 (S608). First an expansion flag for a particular disc element to be expanded is set (S702). This is merely a pointer for keeping track of the element currently being expanded. It is then determined if the expanded JAR is the same JAR that is being expanded (S704). If not, then the JAR's explicit links are added to the expanded JAR's link list as implicit links (S706). If the expanded JAR is the same JAR that is being expanded (S704), or once the JAR's explicit links are added to the expanded JAR's link list as implicit links (S706), it is determined if all the expanded JAR's explicit links have been checked (S708). If all the expanded JAR's explicit links have not been checked, then the next child (S710) of the JAR is checked (S712). It is determined whether if the child is an explicit link (S714). If the child is not an explicit link, the step S708 is repeated. If the child is an explicit link, it is determined whether that child has been expanded. If that child has been expanded then step S708 is repeated. If the child has not been expanded then step S704 is repeated.

Referring back to FIG. 2, after the implicit links have been created, it is determined whether the disc has a dual layer (S216). If the disc has a dual layer then split information is initialized (S218). If the disc does not have a dual layer, or the system has initialized split information, then initial layout is performed (S220).

Figure 10:
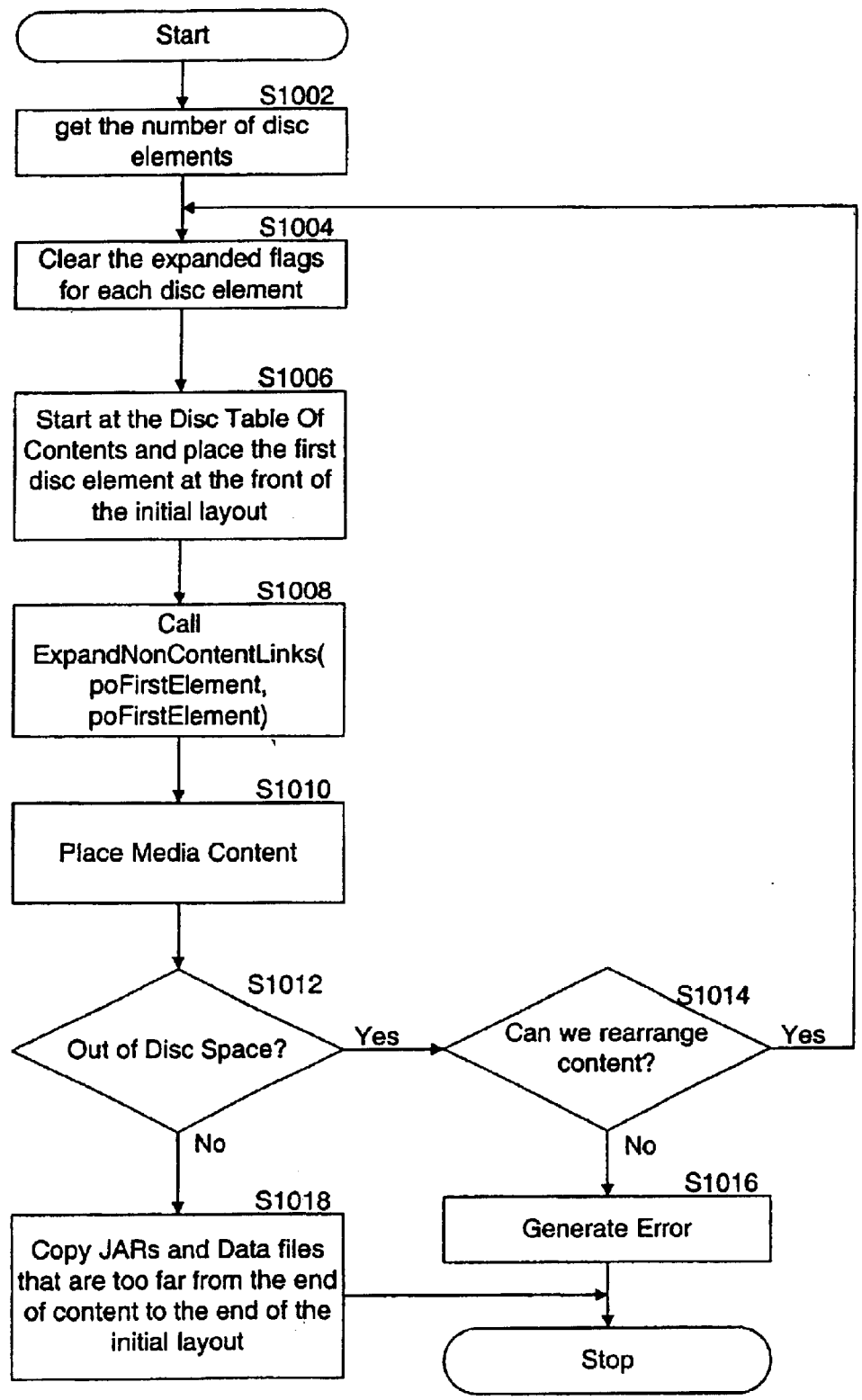
FIG. 10 is a logic flow diagram of an exemplary embodiment of a subroutine for performing the initial layout in the logic flow diagram of FIG. 2.

FIG. 10 is a logic flow diagram of an exemplary embodiment of a subroutine for performing the initial layout (S220) in the DLO system of FIG. 2. First the number of disc elements are retrieved (S1002). The expanded flags for each disc element are cleared (S1004). Then, as retrieved from the disc table of contents, the first disc element is placed at the front of the initial layout (S1006). The non content links of the first element are then expanded (S1008). The media content is placed in the order specified in the work order at the end of the initial layout (S1010). Next, it is determined whether disc has run out of space (S1012). If the disc has run out of space then the initial layout is complete. If the disc has run out of space, a determination is made whether the content can be rearranged to save space (S1014). If the content can be rearranged, the layout is run through a standard permutation algorithm, and the process then returns to step S1004. If the content cannot be rearranged, an error is generated (S1016). The process is repeated until a layout is ascertained resulting from multiple passes through the standard permutation algorithm. After all the items are initially copied onto the disc, if the seek distances from the end of any piece of content to any one of its respective links is outside the maximum seek range., the object of that link, i.e. JAR or data file, is copied to the end of the disc (S1018).

Figure 11:
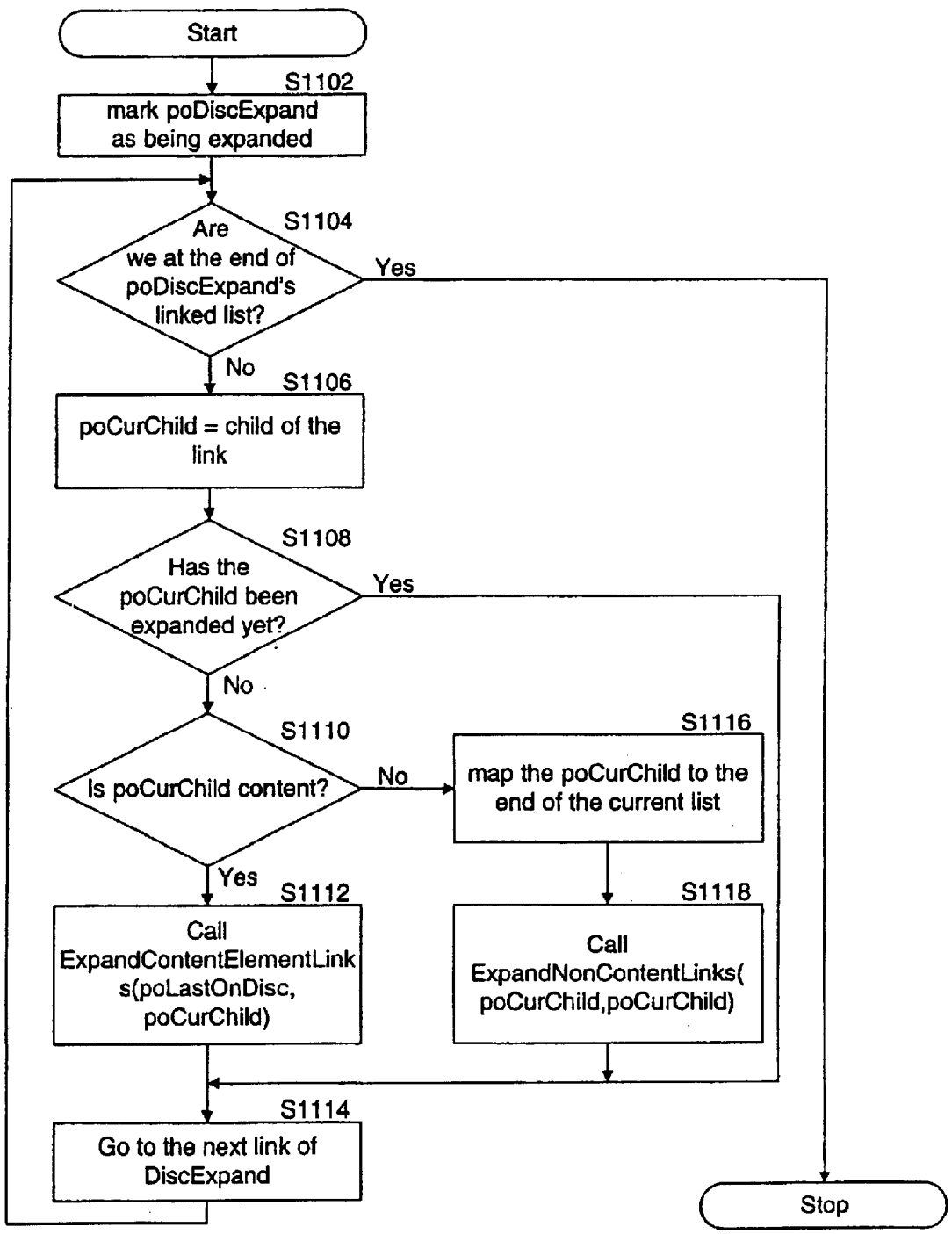
FIG. 11 is a logic flow diagram of an exemplary embodiment of a subroutine for expanding non-content links in the logic flow diagram of FIG. 2.

FIG. 11 is a logic flow diagram of an exemplary embodiment of a subroutine for expanding non-content links in the initial layout subroutine of FIG. 10. First the element is marked, poDiscExpand, as being currently expanded (S1102). It is then determined whether element being expanded is at the end of the element's link list that has been pointed to by PoDiscExpand (S1104), wherein the expansion process stops. If the element being expanded is not at the end of the element's link list pointed to by poDiscExpand (S1104), then the process is moved to the child of the element at poDiscExpand (S1106). It is then determined whether this child of the element, as pointed by poCurChild, has been expanded yet (S1108). If this child has been expanded, then the process moves to the next link on the expansion (S1114) and repeats the process starting at step S1104. If at step S1108, it is determined that the child of the element has not yet been expanded (S1108), it must then be determined whether the child is content (S1110). If the child is not content then the child is mapped to the end of the current list (S1116). The process then repeats starting from step S1102, wherein the child becomes the new element being expanded (S1118). If the child is content (S1110) then content element links are expanded (S1112). After the content element links are expanded, the process moves to the next link in the expansion (S1114) and repeats the process (S1104).

Figure 12:
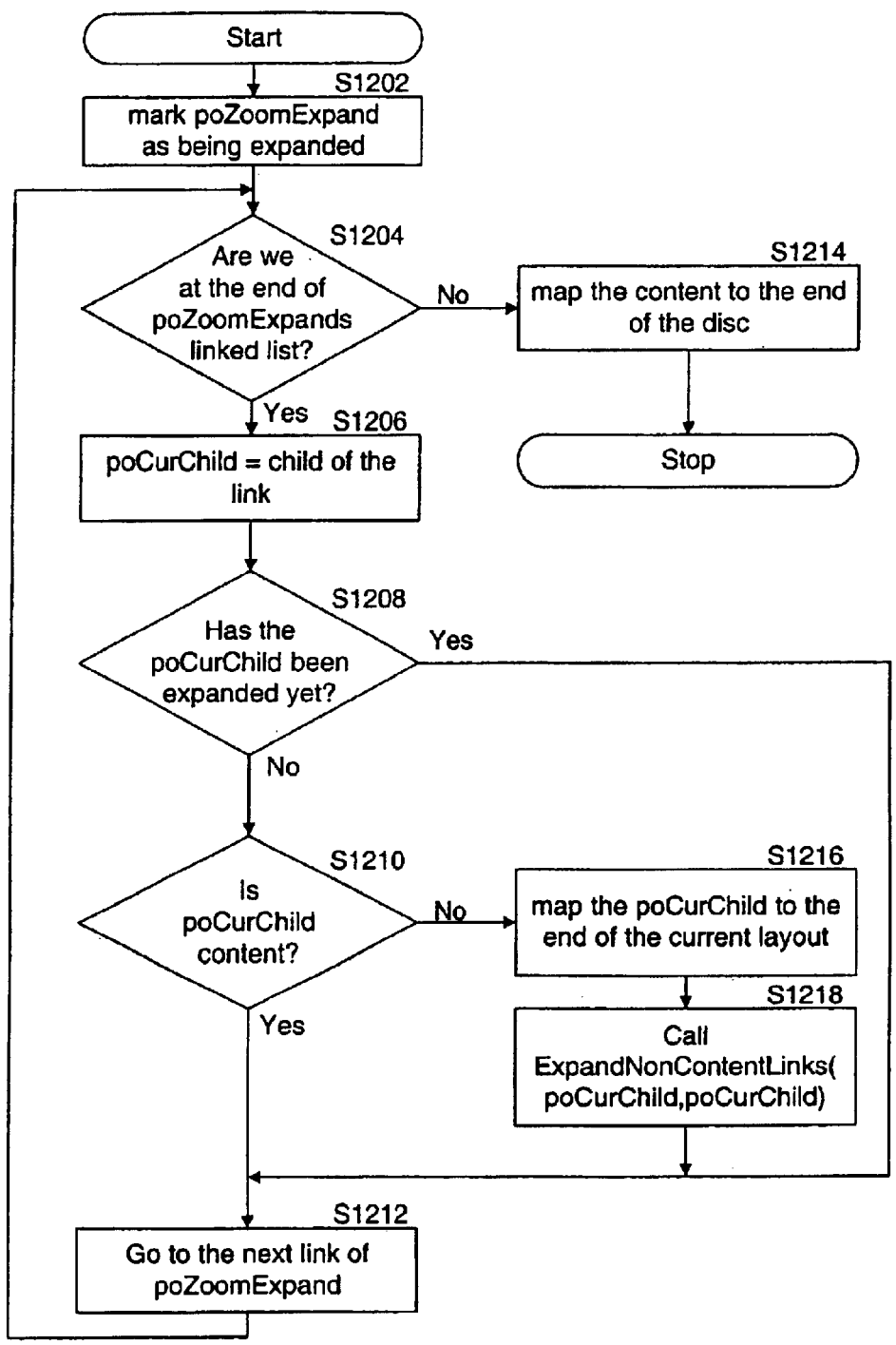
FIG. 12 is a logic flow diagram of an exemplary embodiment of a subroutine for expanding content element links lists in the logic flow diagram of FIG. 2.

FIG. 12 is a logic flow diagram of an exemplary embodiment of a subroutine for expanding element link lists (S1112) is the subroutine of FIG. 11. First, the content element is marked, by pointer poZoomExpand, as the element being expanded (S1202). It is then determined whether the current element is at the end of the content elements, as pointed by poZoomExpand, link list (S1204). If the current element is not at the end of the link list, the content is mapped to the end of the disc (S1214). If the current element is at the end of a link list. the process moves to the next child of the current element (S1206). It is then determined whether that child has been expanded (S1208). If the child has been expanded, the process moves to the next child (S1212) and repeats the process (S1204) until all the elements have been expanded. If the child has not been expanded (S1210), the child is mapped to the end of the current layout (S1216). All non content links are then expanded off this child (S1218), before moving onto the next content link to expand (S1212).

The exemplary scene flow diagram depicted in FIG. 19 will be referred to below to describe the operation of the initial disc layout as depicted in the logic flow diagram of FIG. 10. In the example illustrated, A 1902 is the first element called and placed on the disc 116 and expanded. A's link list 2002 as seen in FIG. 20B is derived from the expansion. The stack 119 is shown in FIG. 20C to represent at what time, which element is currently being expanded. If while expanding A's link list 2002, it is determined that B 1904 has not been expanded, it is mapped to the end of the current list, as seen in FIG. 20D.

B's link list 2004, best seen in FIG. 20E, is expanded, wherein B is marked as being expanded on the stack 119 (FIG. 20F). If it is determined that C 1906 has not been expanded, it is mapped to the end of the current list, as seen in FIG. 20G.

C's link list 2006, best seen in FIG. 20H, is expanded, wherein C is marked as being expanded on the stack 119 (FIG. 20I). J 1918 is media without code, for example a movie, which appears at the end of the initial layout. Therefore J 1918 is passed over and the algorithm proceeds back to A's second link to F 1910. F 1910 has not been expanded, so it is mapped to the end of the current list as seen in FIG. 20J.

F's link list 2008 is expanded, and F is placed on the stack 119 as the element currently being expanded (FIG. 20L). G 1912 has not been expanded, so it is mapped to the end of the current list as seen in FIG. 20M.

G's link list 2010 is expanded, and G is placed on the stack 119 as the element currently being expanded (FIG. 20O). H 1914 has not been expanded, instead of calling the Expand Non-Content link list function, the expand Content LINK list function is called because H 1914 is content. B 1904, C 1906, and F 1910 elements on H's link list 2012 as seen in FIG. 20P have already been marked as expanded. However, D 1908 has not been expanded, so it is mapped to the end of the current list as seen in FIG. 21A.

D's link list 2102 as seen in FIG. 216, is expanded, and D is placed on the stack 119 as the element currently being expanded (FIG. 21C). H 1914, I 1916, and J 1918, are content and cannot be expanded unless these contents were explicit links. Therefore D's expansion is complete.

Continuing after D, down H's link list 2012, the remaining elements are implicit content elements (and hence, are ignored). Therefore, returning to H's stack 119, as seen in FIG. 20Q, in the Expand Content Element Link List function 1112, H 1914 is mapped at the end of the current disc (FIG. 21D).

FIG. 21E shows the initial layout on the disc 116 along with the length from each element in H's link list 2012 to the end of H 1914.

Figure 22A:
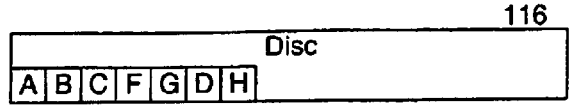
FIGS. 22A–22J depict methods for determining an initial disc layout in accordance with the present invention.
Figure 22B:
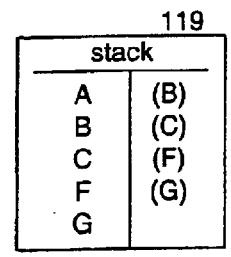
Figure 22C:
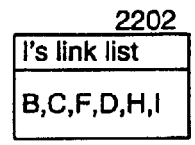
Figure 22D:
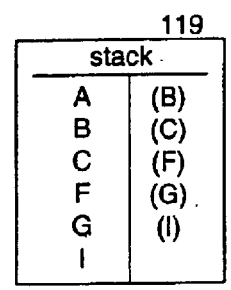
Figure 22E:
Figure 22F:
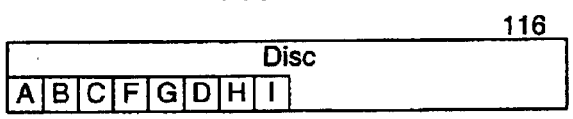
Figure 22G:
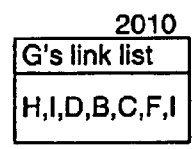
Figure 22H:
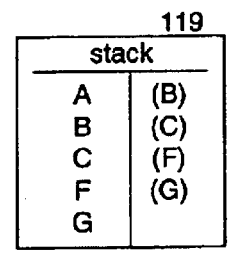
Figure 22I:
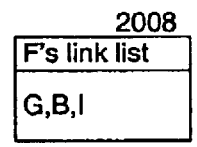
Figure 22J:
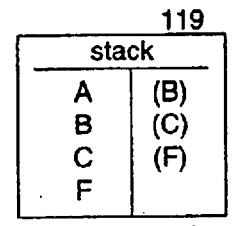

Continuing with the expansion of G 1912, after the element I 1916 in G's link list 2010, the remaining elements have been expanded (except J 1918, which appears at the end of the initial layout of the disc). So, the expansion of G 1912 is complete and is removed from the stack 119 (FIG. 22J).

Continuing with the expansion of F 1910 after the element G 1912 in F's link list 2008, the remaining elements have also been expanded (again except for J 1918, which appears at the end of the initial layout of the disc.) So, the expansion of F is complete and is removed from the stack 119 (FIG. 20I).

F 1910 was the last element in C's link list 2006, so the expansion of C's link list is complete. It too is removed from the stack 119 (FIG. 20F).

G 1912 has already been expanded, so the expansion of B's link list 2004 is also complete. B 1904 is then removed from the stack 119 (FIG. 20C).

F 1910 has already been expanded, so the expansion of A's link list 2002 is also complete. A 1902 is then removed from the stack 119.

J 1918 is then added to the end of the disc 116. F 1910 is J's 1918 only implicit link. F 1910 exists before J 1918, but cannot be reached from the end because the seek time is too long.

Therefore, F 1910 is added to the end of the disc 116. Since F 1910 has been expanded, J 1918 is removed from the stack and the process is terminated.

Figure 23A:
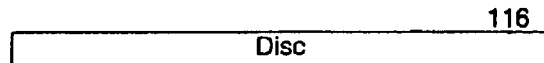
FIGS. 23A–23J depict methods for determining an initial disc layout in accordance with the present invention.
Figure 23B:
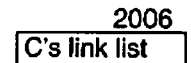
Figure 23C:
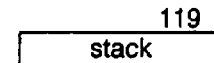
Figure 23D:
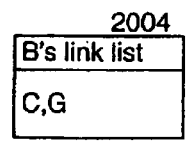
Figure 23E:
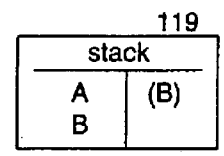
Figure 23F:
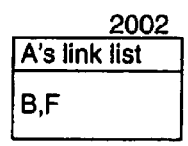
Figure 23G:
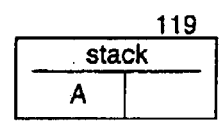
Figure 23H:
Figure 23I:
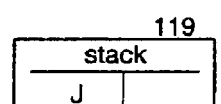
Figure 23J:
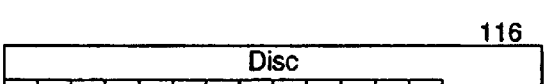

Then, as discussed with reference to FIG. 10, specifically step S1018, after all the elements are added to the disc, depicted for example in FIG. 23H, when the seek distances from the end of any piece of content to any one of its respective links is outside the maximum seek range, the object of that link, i.e. JAR or data file, is copied to the end of the disc. Presuming therefore, that B 1904, C 1906, F 1910, and D 1908 have seek distanced outside the maximum seed range. As seen in FIG. 23J, items B 1904, C 1906, F 1910, and D 1908 are therefore copied to the end of the disc.

The initial layout for this exemplary scene flow of FIG. 19 is therefore depicted in FIG. 23J.

This is the basis for the replication, recalculation, and removal functions in the present invention.

Referring back to FIG. 2, after the initial layout (S220), at least one element is replicated onto the initial layout resulting in a modified layout, the new link lengths in the modified layout are recalculated, and any unnecessary elements are removed from the modified layout (S222).

Figure 13:
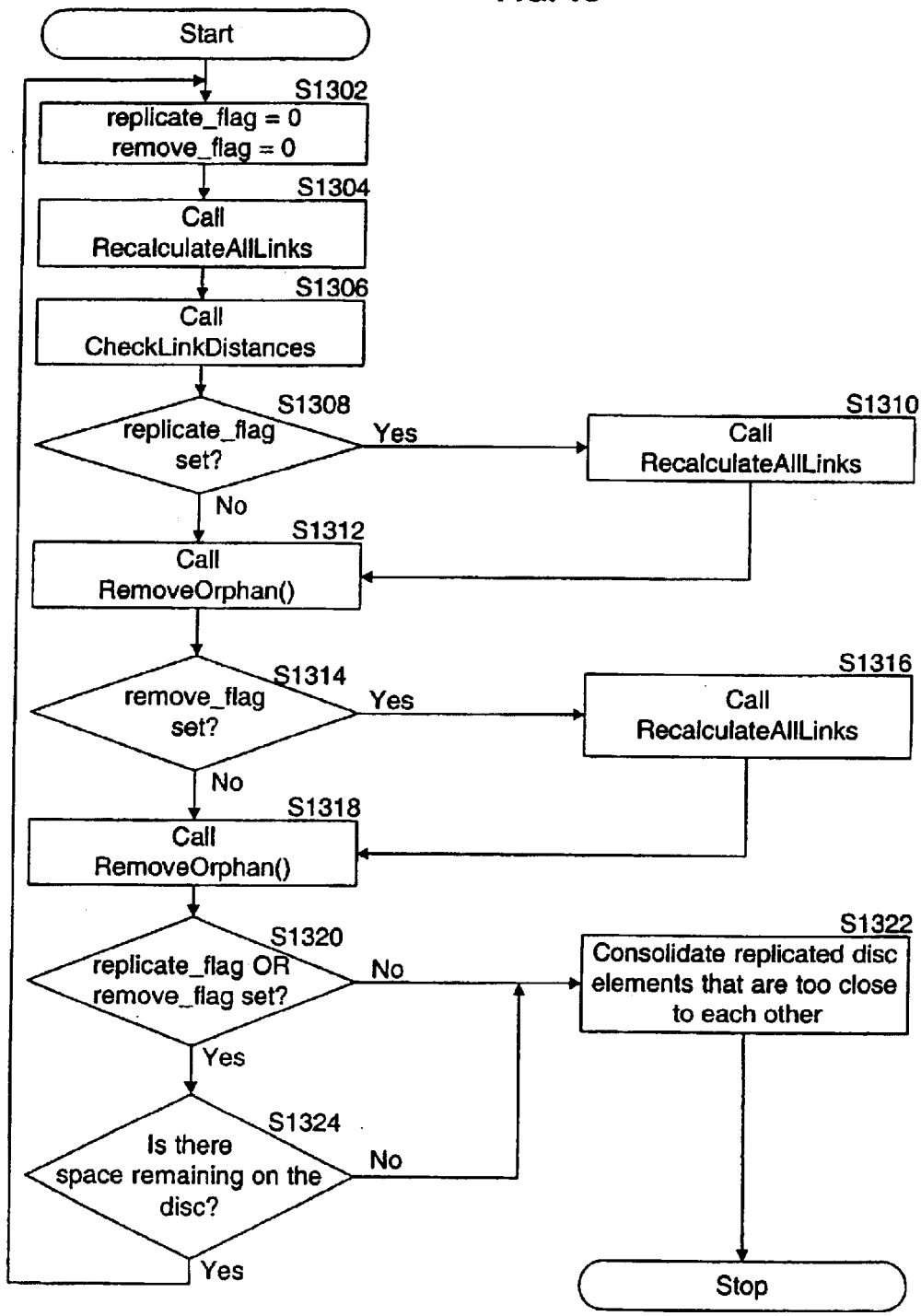
FIG. 13 is a expanded logic flow diagram of an exemplary embodiment of a subroutine for replicating elements, recalculating link lengths, and removing elements from the initial layout in the logic flow diagram of FIG. 2.

FIG. 13 is a logic flow diagram of an exemplary embodiment of a subroutine for replicating elements, recalculating link lengths, and removing elements from the initial layout for the DLO system of FIG. 2 (S202). First the replication flag and remove flag are set to zero (S1302). Then all links are recalculated (S1304), prior to checking all the link distances (S1306). It is then determined whether the replication flag is set, i.e. whether the flag is at a non-zero indication (S1308). If the replication flag has been set, then all the links are recalculated (S1310). If the replication flag is not set (S1308), or if all the links have been recalculated (S1310), then any orphan elements are removed (S1312). It is then determined whether the remove flag is set, i.e. whether the remove flag is at a zero indication (S1314). If the remove flag is set, then all links are recalculated (S1316). If the remove flag is not set (S1314), or if the links have been recalculated (S1316), all orphan elements are removed (S1318). It is then determined whether either the replicate flag or the remove flag is set (S1320). If it is determined that either the replicate flag or the remove flag is set (S1320), it is then determined if there is space remaining on the disc to support replication of elements (S1324). If there is space remaining on the disc, the process is repeated starting with step S1302. If neither the replicate flag nor the remove flag are set (S1320), or if there is no space remaining on the disc (S1324), the replicated disc elements that are too close to each other are consolidated (S1322).

Figure 18:
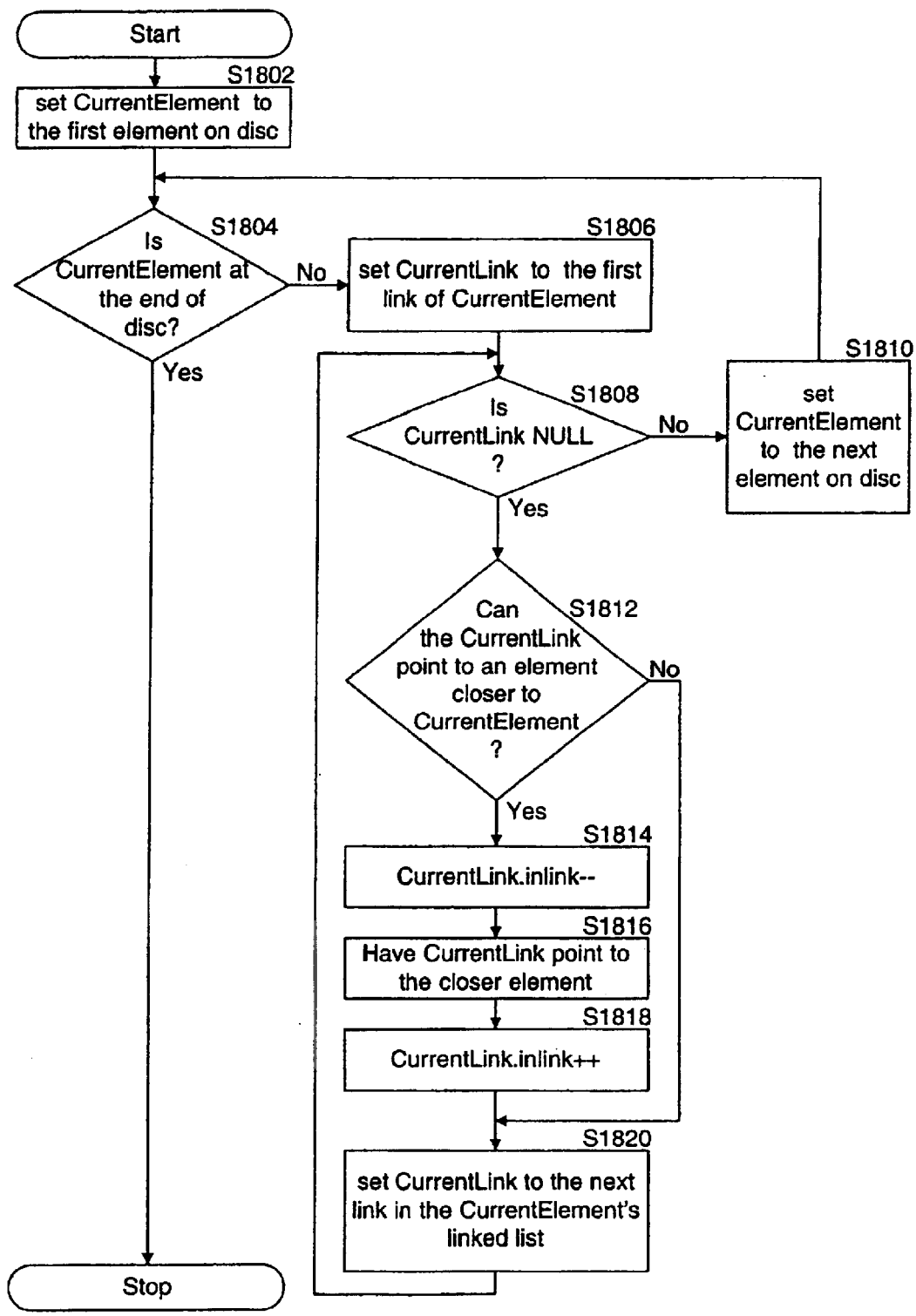
FIG. 18 is a logic flow diagram of an exemplary embodiment of a subroutine for recalculating links in the logic flow diagram of FIG. 2.

FIG. 18 is a logic flow diagram of an exemplary embodiment of a subroutine for recalculating all links (S1304) for the DLO system of FIG. 2. The first element on the disc is set as the current element (S1802). It is then determined whether the current element is at the end of the disc (S1804). If the current element is at the end of the disc, the process is stopped. If the current element is not at the end of the disc, the current element is set to the first element on the disc (S1806). It is then determined whether the current link is at the end of the link list (S1808). If the current link is not at the end of the link list, the current element is set to the first element on the disc (S1810) and the process is repeated (S1804). If the current link is at the end of the link list, it is then determined whether CurrentLink can point to an element closer to current element (S1812). If CurrentLink can point to an element closer to CurrentElement (S1812), then (S1814). CurrentLink is then pointed to the closer element (S1816). The system then (S1818). After the system has either (S1818), or determined that the CurrentLink cannot point to an element closer to CurrentElement (S1812), CurrentLink is set to the next link in the CurrentElement's link list (S1820). The process is then repeated with the next link starting at step S1808.

Figure 14:
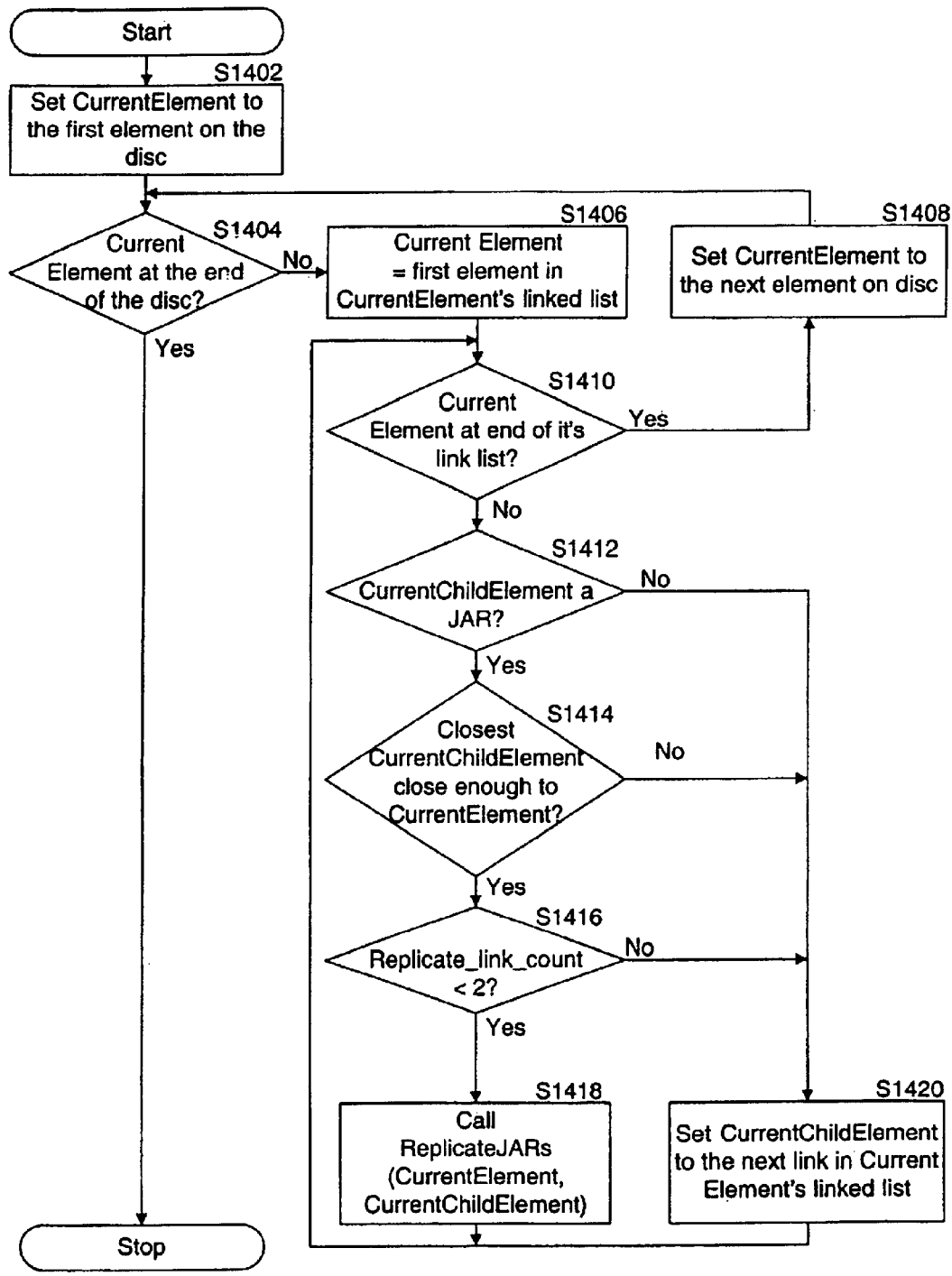
FIG. 14 is a logic flow diagram of an exemplary embodiment of a subroutine for checking the link distances in the logic flow diagram of FIG. 2.

Referring back to FIG. 13, once all the links have been recalculated (S1304), the system checks all the link distances (S1306). FIG. 14 is a logic flow diagram of an exemplary embodiment of the DLO system in accordance with the present invention for checking all the link distances (S1306). The system first sets CurrentElement to the first element on the disc (S1402). The system then determines whether the current element is at the end of the disc (S1404). If the current element is at the end of the disc, the procedure stops. If the current element is not at the end of the disc, CurrentElement is set to the first element in CurrentElement's link list (S1406). It is then determined whether the current element is at the end of its link list (S1410). If the current element is at the end of its link list, then the CurrentElement is set to the next element on the disc (S1408) and the process is repeated starting at step S1404. If the current element is not at the end of its link list, it is determined whether CurrentChildElement is a JAR (S1412). If CurrentChildElement is a JAR, it is determined whether the closest CurrentChildElement is close enough to the CurrentElement (S1414). If the closest CurrentChildElement is close enough to the CurrentElement, it is determined whether Replicate_link_count is less than a predetermined number, e.g., 2 (S1416). If Replicate_link_count is less than, e.g., 2, then the JARs of the current element are replicated (S1418). If: CurrentChildElement is not a JAR (S1412); it is determined that the closest CurrentChildElement is not close enough to CurrentElement (S1414); or Replicate_link_count is not less than a predetermined number, e.g., 2 (S1416), then CurrentChildElement is set to the next link in the Current Element's link list (S1420). Once either the JARs have been replicated (S1418) or the CurrentChildElement has been set to the next link in the Current Element's link list (S1420), the procedure is repeated, starting at step S1410.

Figure 15:
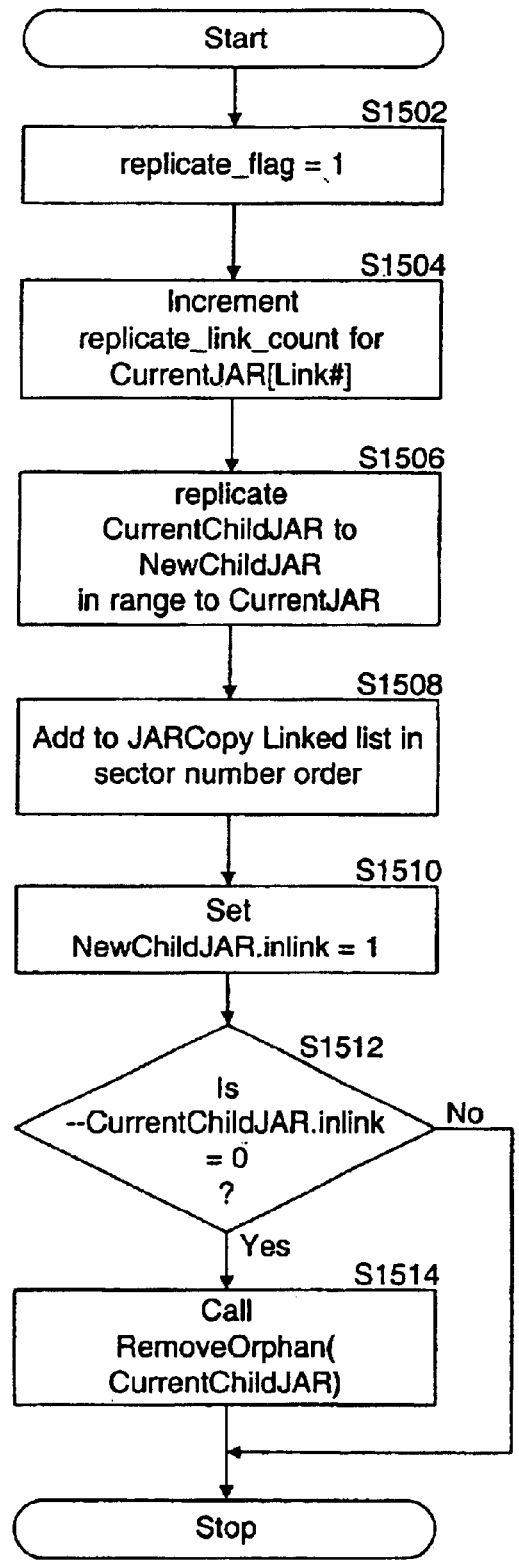
FIG. 15 is a logic flow diagram of an exemplary embodiment of a subroutine for replicating JARs in the logic flow diagram of FIG. 2.

FIG. 15 is a logic flow diagram of an exemplary embodiment of a subroutine for replicating JARs (S1418) for the DLO system of FIG. 2. The; replicate_flag is first set to 1 (S1502). This flag indicates that the JAR has been replicated. Replicate_link_count is incremented for CurrentJar (S1504), thereby monitoring the number of times a JAR has been replicated. CurrentChildJAR is replicated at a point, NewChildJAR, within the seek distance range of CurrentJAR (S1506). NewChildJar is then added to JARCopy linked list in sector number order (S1508), and NewChildJAR.inlink is set to 1 (S1510). CurrentChildJAR.inlink is then decremented and it is determined whether CurrentChildJAR.inlink is 0 (S1512). If it is, CurrentChildJAR is removed (S1514).

Figure 24:
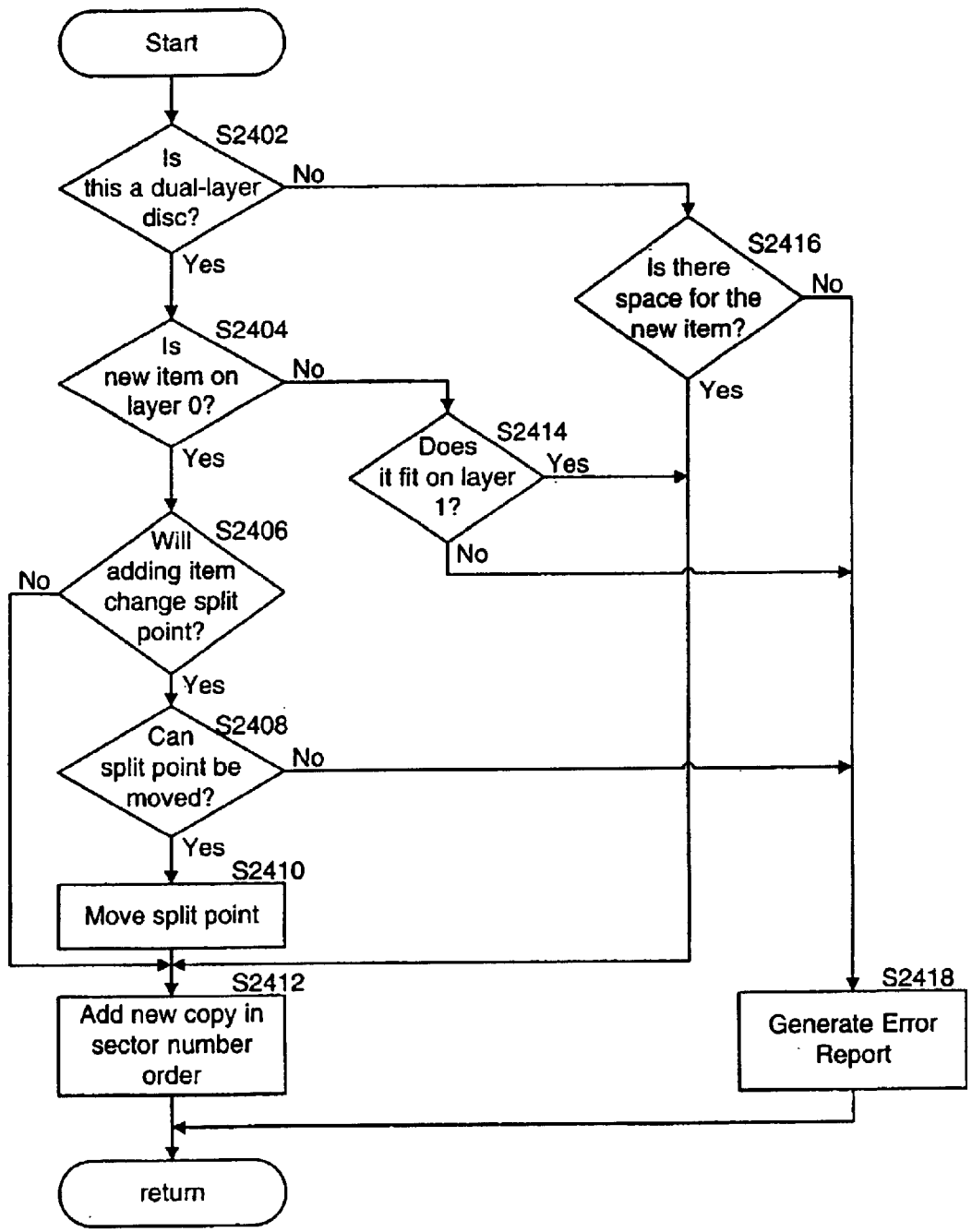
FIG. 24 is a logic flow diagram of an exemplary embodiment of a subroutine for adding disc elements in the logic flow diagram of FIG. 15.

FIG. 24 is a logic is a logic flow diagram of an exemplary embodiment of a subroutine for adding disc elements in the logic flow diagram of FIG. 15. Specifically, when NewChildJar is added to JARCopy linked list in sector number order (S1508), a subroutine, such as for example, that of FIG. 24 is used. Initially, it is determined whether the disc is an opposite track dual layer disc (S2402). If the disc is an opposite track dual layer disc, it is determined whether the new item, NewChildJar, is to be added to layer 0 (S2404). If the new item is to be added to layer 0, it is then determined whether the split point on the disc will change resulting from the addition of this item (S2406). If it is determined that the split point will change by the addition of this item, it is then determined whether the split point can actually be moved and still provide a usable disc layout (S2408). If the split point can actually be moved, it is moved (S2410), and the new item is added to the disc in sector number order (S2412).

If it is determined that the disc is not an opposite track dual layout disc (S2402), it is determined if there is space on the disc for the new item (S2416). If there is not enough space on the disc, an error is output on error reports 126 (S2418). If there is enough space on the disc, the new item is added to the disc in sector number order (S2412).

If it is determined that the new item is not to be placed on layer 0 (S2404), it is determined whether the new item will fit on layer 1 (S2414). If the new item will not fit on layer 1, an error is output on error reports 126 (S2418). On the other hand, if the new item fits on layer 1, the new item is added to the disc in sector number order (S2412).

If the new item is to be added to layer 0 (S2404), and it is determined that the addition of the new item will not change the split point (S2406), the new item is added to the disc in sector number order (S2412).

Figure 16:
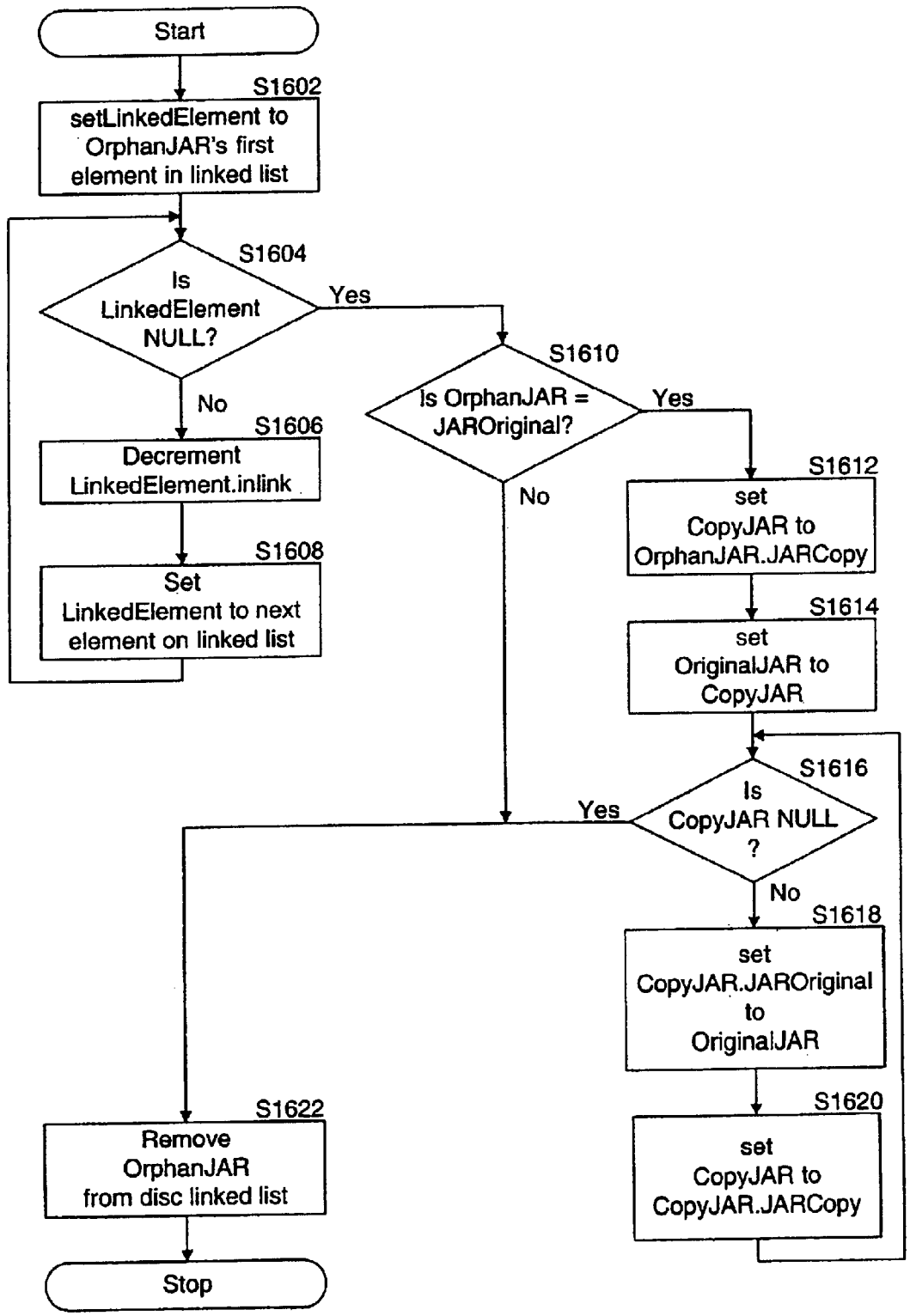
FIG. 16 is a logic flow diagram of an exemplary embodiment of a subroutine for removing orphan JARs in the logic flow diagram of FIG. 2.

If the new item is to be added to layer 0 (S2404), and it is determined that the addition of the new item will change the split point (S2406), however, it is determined that the split point cannot be moved and provide a usable disc layout (S2408), an error is output on error reports 126 (S2418), FIG. 16 is a logic flow diagram of an exemplary embodiment of a subroutine for removing orphan JARs (S1514) for the DLO system 100 of FIG. 2. In the subroutine of FIG. 6, a first LinkedElement is set the OrphanJAR's first element in the linked list (S1602). It is then determined whether LinkedElement is null, i.e. if it is at the end of the link list (S1604). If LinkedElement is not null, it is then decremented (S1606), the LinkedElement is then set to the next element on the link list, whereupon the process returns to step S1604. If LinkedElement is null, it is determined whether OrphanJAR is JAROriginal (S1610). If OrphanJAR is not JAROriginal, then the OrphanJAR is removed from the disc link list (S1622). If OphanJAR is the JAROriginal the CopyJAR is set to OrphanJAR.JARCopy (S1612). OriginalJAR is then set to CopyJAR (S1614). It is then determined whether CopyJAR is null (S1616). If so, OrphanJAR is removed from the disc link list (S1622). If CopyJAR is not null, CopyJAR.JAROrigional is set to OriginalJar (S1618). CopyJAR is set to CopyJAR.JARCopy (S1620), before it is again determined whether CopyJAR is null (S1616).

Figure 17:
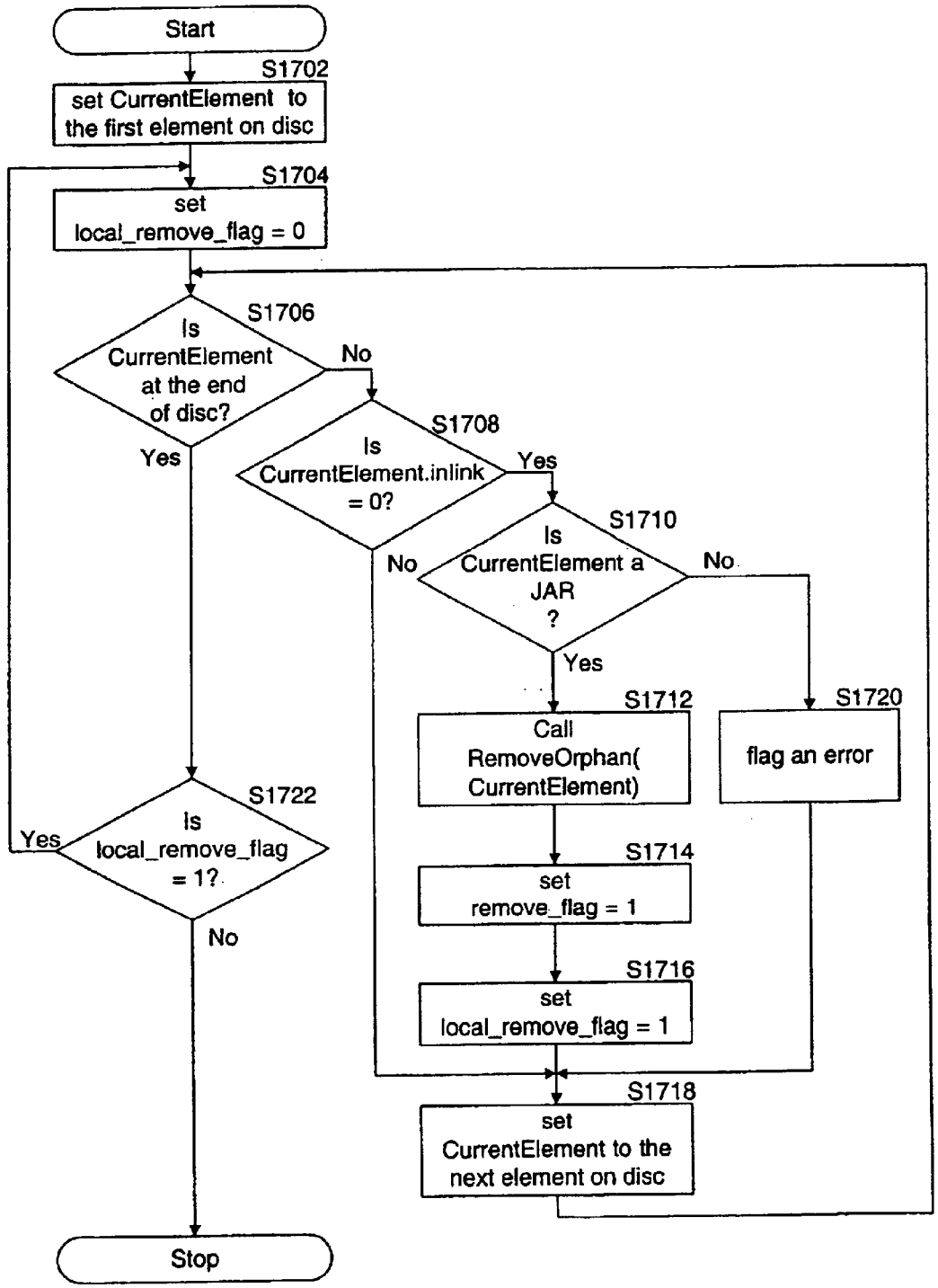
FIG. 17 is a logic flow diagram of an exemplary embodiment of a subroutine for determining when to remove orphan JARs in the logic flow diagram of FIG. 2.

FIG. 17 is a logic flow diagram of an exemplary embodiment of a subroutine for determining when to remove orphan JARs from the DLO system 100 of FIG. 2. First CurrentElement is set to the first element on the disc (S1702) and then local_remove_flag is set to zero (S1704) indicating that nothing has yet been removed. Next, it is determined whether CurrentElement is at the end of the disc (S1706). If CurrentElement is at the end of the disc, it is then determined whether local_remove_flag is equal to 1, i.e. whether anything been removed (S1722). If CurrentElement is at the end of the disc, and local_remove_flag is not equal to 1, the subroutine stops. If CurrentElement is at the end of the disc, and local_remove_flag is equal to 1, local_remove_flag is reset to zero and the process repeats (S1704). If CurrentElement is not at the end of the disc (S1706), it is determined whether CurrentElement.inlink is zero (S1708). If not, the next element on the disc is set to CurrentElement (S1718) and the process repeats (S1706). If CurrentElement.inlink is zero, it is then determined whether CurrentElement is a JAR (S1710). If CurrentElement is not a Jar, then an error is flagged (S1720), and CurrentElement is set to the next element on the disc (S1718). If CurrentElement is a Jar, then the JAR is removed (S1712), remove_flag is set to 1 indicating that a Jar has been removed (S1714), local_remove_flag_ is set to 1 (S1716), and finally CurrentElement is set to the next element on the disc (S1718).

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for optimizing a disc layout, said disc layout to be written on a disc, the method comprising the steps of:
    receiving disc elements from a scene code builder;
    receiving explicit scene links from the scene code builder, said explicit scene links being connections between elements that are specified by the scene code builder;
    creating implicit links between at least two explicit scene links, said implicit links being connections between elements that are not specified by the scene code builder and are derived from a scene flow;
    performing an initial disc layout of the disc elements, the explicit scene links, and the implicit scene links;
    replicating at least one of the disc elements onto the initial disc layout thereby creating a modified layout having a duplication of at least one disc element.

2. The method for optimizing a disc layout according to claim 1, further comprising the step of:
    creating navigation tables having sector addresses for each disc element and sector addresses for replications of each disc element.

3. The method for optimizing a disc layout according to claim 1, wherein the step of creating implicit scene links between at least two explicit scene links further comprises:
    expanding a disc element thereby dentifying the implicit links associated with each disc element.

4. The method for optimizing a disc layout according to claim 1, further comprising the step of:
    creating firmware JARs.

5. The method for optimizing a disc layout according to claim 1, further comprising the step of:
    determining if the disc is an opposite track dual layer disc.

6. The method for optimizing a disc layout according to claim 5, wherein when the disc is determined to be an opposite track dual layer disc, further comprising the step of:
    determining whether the addition of the item will move a split point on the disc.

7. The method for optimizing a disc layout according to claim 6, wherein when the addition of the item is determined to move the split point on the disc, further comprising the step of:
    moving the split point on the disc.

8. A method for optimizing a disc layout, said disc layout to be written on a disc, the method comprising the steps of:
    receiving disc elements from a scene code builder;
    receiving explicit scene links from the scene code builder, said explicit scene links being connections between elements that are specified by the scene code builder;
    creating implicit scene links between at least two explicit scene links, said implicit links being connections between elements that are not specified by the scene code builder and are derived from a scene flow;
    performing an initial disc layout of the disc elements, the explicit scene links, and the implicit scene links;
    replicating at least one of the disc elements onto the initial disc layout thereby creating a modified layout having a duplication of at least one disc element; and
    removing at least one disc element from the modified layout.

9. The method for optimizing a disc layout according to claim 8, further comprising the step of:

creating navigation tables having sector addresses for each disc element and sector addresses for replications of each disc element.

10. The method for optimizing a disc layout to claim 8, wherein the step of creating implicit scene links between at least two explicit scene links further comprises:

expanding a disc element thereby identifying the implicit scene links associated with the disc elements.

11. The method for optimizing a disc layout according to claim 8, further comprising the step of:

creating firmware JARs.

12. The method for optimizing a disc layout according to claim 8, further comprising the step of:

determining if the disc is an opposite track dual layer disc.

13. The method for optimizing a disc layout according to claim 12, wherein when the disc is determined to be an opposite track dual layer disc, further comprising the step of:

determining whether the addition of the item will move a split point on the disc.

14. The method for optimizing a disc layout according to claim 13, wherein when the addition of the item is determined to move the split point on the disc, further comprising the step of:

moving the split point on the disc.

15. A method for optimizing a disc layout, said disc layout to be written on a disc, the method comprising the steps of:

receiving disc elements from a scene code builder;

receiving explicit scene links from the scene code builder, said explicit scene links being connections between elements that are specified by the scene code builder;

creating implicit scene links between at least two explicit scene links, said implicit links being connections between element; that are not specified by the scene code builder and are derived from a scene flow;

performing an initial disc layout of the disc elements, the explicit scene links, and the implicit scene links;

replicating at least one of the disc elements onto the initial disc layout thereby creating a modified layout having a duplication of at least one disc element;

removing at least one disc element from the modified layout; and performing a final layout of the disc elements, the explicit scene links, and the implicit scene links.

16. The method for optimizing a disc layout according to claim 15, further comprising the step of:

creating navigation tables having sector addresses for each disc element and sector addresses for replications of each disc element.

17. The method for optimizing a disc layout according to claim 15, wherein the step of creating implicit scene links between at least two explicit scene links further comprises:

expanding a disc element thereby identifying the implicit scene links associated with the disc element.

18. The method for optimizing a disc layout according to claim 15, further comprising the step of:

creating firmware JARs;

adding said firmware JARs to said initial layout.

19. The method for optimizing a disc layout according to claim 15, further comprising the step of:

determining if the disc is an opposite track dual layer disc.

20. The method for optimizing a disc layout according to claim 19, wherein when the disc is determined to be an opposite track dual layer disc, further comprising the step of:

determining whether the addition of the item will move a split point on the disc.

21. The method for optimizing a disc layout according to claim 20, wherein when the addition of the item is determined to move the split point on the disc, further comprising the step of:

moving the split point on the disc.

22. The method for optimizing a disc layout according to claim 18, further comprising the step of:

determining whether any explicit scene links or implicit scene links are larger than a predetermined memory.

23. A computer system for optimizing a disc layout, to be written on a disc comprising:

means for receiving disc elements from a scene code builder;

means for receiving scene links from the scene code builder, said explicit scene links being connections between elements that are specified by the scene code builder;

means for creating implicit scene links between at least two explicit scene links, said implicit links being connections between elements that are not specified by the scene code builder and are derived from a scene flow;

means for performing an initial disc layout of the disc elements, the explicit scene links, and the implicit scene links;

means for replicating at least one of the disc elements onto the initial disc layout to create a modified layout having a duplication of at least one disc element.

24. The computer system according to claim 23, further comprising:

means for removing at least one disc element from the modified layout.

25. The computer system according to claim 24, further comprising:

means for performing a final layout of the disc elements, the explicit scene links and the implicit scene links.

26. A method of making a disc layout, said layout to be written on a disc, comprising the steps of:

receiving the disc elements from a scene code builder;

receiving, from the scene code builder, explicit scene links that define a connection between at least two disc elements that are specified by the scene code builder;

creating implicit scene links between at least two disc elements, said implicit links being connections between elements that are not specified by the scene code builder and are derived from a scene flow;

making a disc layout having the disc elements, the explicit scene links, and the implicit scene links.

27. A computer readable medium containing instructions to cause a computer to perform the steps of:

receive disc elements from a scene code builder;

receive, from the scene code builder, explicit scene links that define a connection between at least two disc elements that are specified by the scene code builder;

create implicit scene links between at least two disc elements, said implicit links being connections between elements that are not specified by the scene code builder and are derived from a scene flow;

make a disc layout having the disc elements, the explicit scene links, and the implicit scene links.

* * * * *